(12) United States Patent
Sandbrook et al.

(10) Patent No.: US 12,295,358 B2
(45) Date of Patent: May 13, 2025

(54) SYSTEM AND METHOD FOR AUTONOMOUS DETECTION OF PLANT MATTER AND SELECTIVE ACTION ON PLANT MATTER IN AN AGRICULTURE FIELD

(71) Applicant: SeedSpider Ltd, Palmerston North (NZ)

(72) Inventors: Donald Harry Sandbrook, Palmerston North (NZ); Brendan Taylor, Palmerston North (NZ); William Haarhoff, Palmerston North (NZ); Tobin Hall, Palmerston North (NZ)

(73) Assignee: SeedSpider Ltd, Palmerston North (NZ)

( * ) Notice: Subject to any disclaimer, the term of this patent is extended or adjusted under 35 U.S.C. 154(b) by 0 days.

(21) Appl. No.: 18/674,076

(22) Filed: May 24, 2024

(65) Prior Publication Data
US 2024/0397928 A1 Dec. 5, 2024

Related U.S. Application Data

(60) Provisional application No. 63/468,752, filed on May 24, 2023.

(51) Int. Cl.
*A01M 21/02* (2006.01)
*A01B 69/04* (2006.01)
*G01C 21/20* (2006.01)
*G01S 17/894* (2020.01)

(52) U.S. Cl.
CPC .......... *A01M 21/02* (2013.01); *A01B 69/008* (2013.01); *G01C 21/20* (2013.01); *G01S 17/894* (2020.01)

(58) Field of Classification Search
None
See application file for complete search history.

(56) References Cited

U.S. PATENT DOCUMENTS

| | | | | |
|---|---|---|---|---|
| 5,442,552 | A * | 8/1995 | Slaughter | G06V 10/25 701/28 |
| 2014/0180549 | A1* | 6/2014 | Siemens | A01B 39/18 701/50 |
| 2014/0260148 | A1* | 9/2014 | Jens | A01D 34/52 56/10.2 R |
| 2016/0361949 | A1* | 12/2016 | Cavender-Bares | A01B 39/12 |
| 2017/0251589 | A1* | 9/2017 | Tippery | A01B 3/50 |
| 2018/0153084 | A1* | 6/2018 | Calleija | A01B 79/005 |
| 2019/0150357 | A1* | 5/2019 | Wu | H04N 7/188 |

(Continued)

*Primary Examiner* — Daniel L Greene
(74) *Attorney, Agent, or Firm* — Run8 Patent Group, LLC; Peter Miller

(57) ABSTRACT

A method includes, at a mobile chassis: detecting presence of a plant in a crop row based on an image of the crop bed captured by a LIDAR sensor integrated into the mobile chassis; estimating a first distance from the plant to a first weeding tool aligned to the crop row and coupled to a front of a rail mounted to the mobile chassis; estimating a second distance from the plant to a second weeding tool aligned to the crop row and coupled to a rear of the rail; driving the first weeding tool according to a first pathway to locate the first weeding tool on a first side of the plant at a first time; and, driving the second weeding tool according to a second pathway to locate the second weeding tool on a second side of the plant at a second time succeeding the first time.

20 Claims, 10 Drawing Sheets

(56) References Cited

U.S. PATENT DOCUMENTS

| | | | |
|---|---|---|---|
| 2019/0239502 A1* | 8/2019 | Palomares | G05D 1/0246 |
| 2021/0022282 A1* | 1/2021 | Wallach | A01B 63/004 |
| 2021/0243940 A1* | 8/2021 | Snyder | A01M 21/02 |
| 2022/0113161 A1* | 4/2022 | Vandike | G01C 21/3885 |
| 2024/0260562 A1* | 8/2024 | Kremesec | A01B 63/163 |
| 2024/0265547 A1* | 8/2024 | Cui | A01B 69/008 |

* cited by examiner

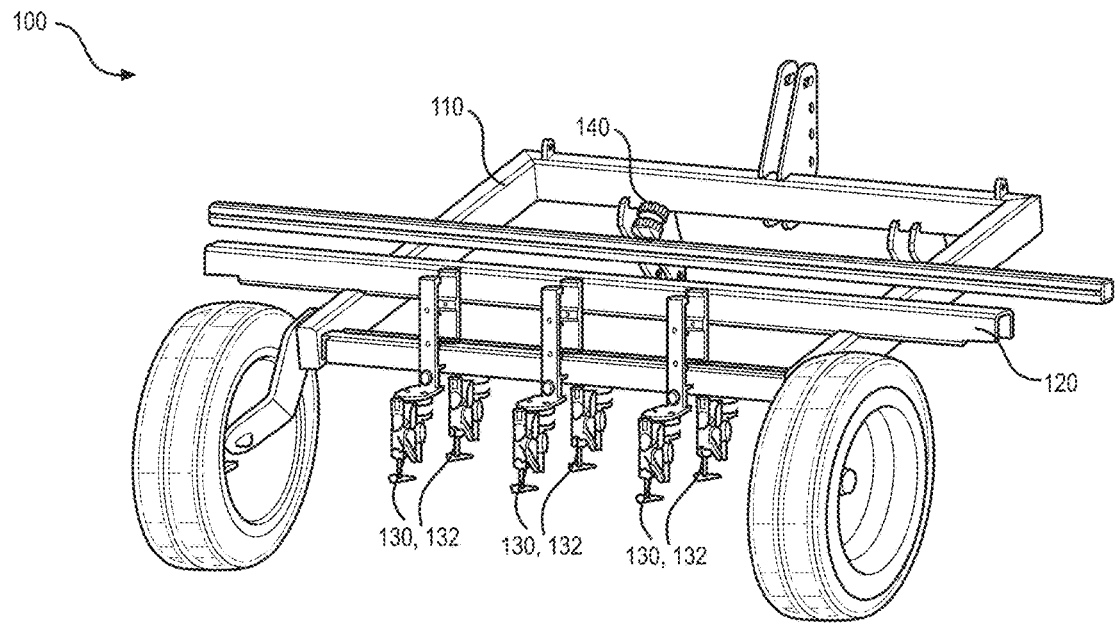
FIGURE 7
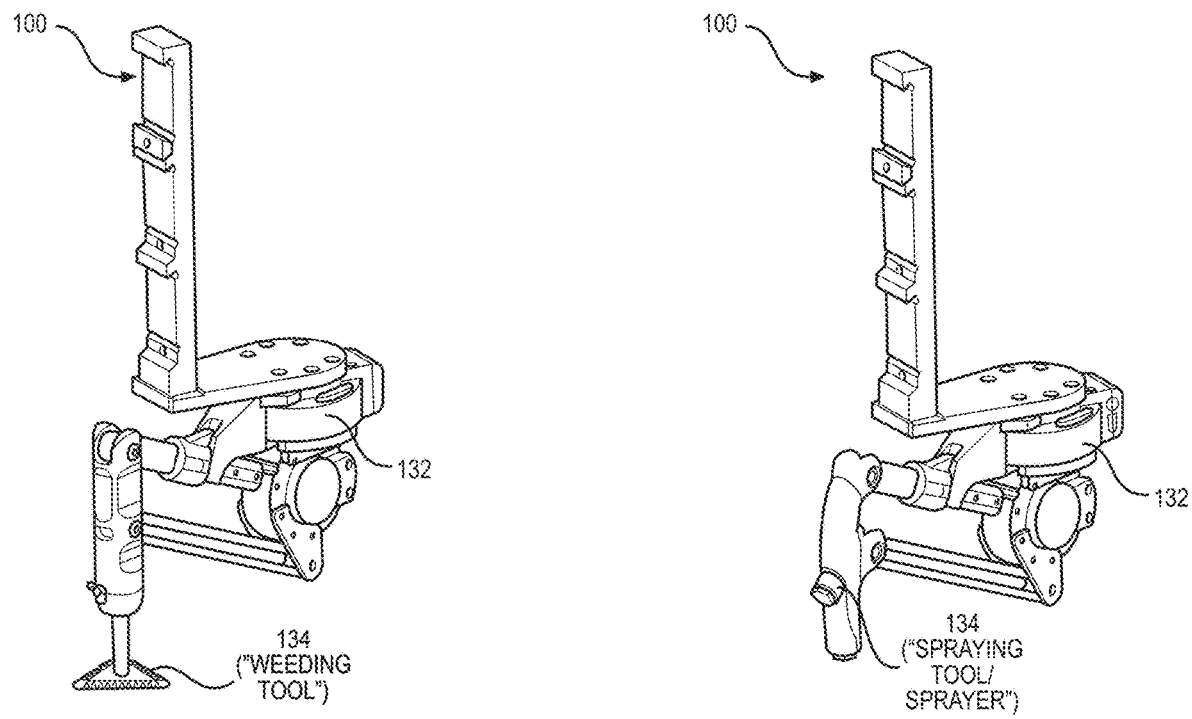
FIGURE 8A  FIGURE 8B

SYSTEM AND METHOD FOR AUTONOMOUS DETECTION OF PLANT MATTER AND SELECTIVE ACTION ON PLANT MATTER IN AN AGRICULTURE FIELD

CROSS-REFERENCE TO RELATED APPLICATIONS

This Application claims the benefit of U.S. Provisional Application No. 63/468,752, filed on 24 May 2023, which is incorporated in its entirety by this reference.

TECHNICAL FIELD

This invention relates generally to the field of agriculture and more specifically to a new and useful system and method for autonomous detection and selective action on plant matter in the field of agriculture.

BRIEF DESCRIPTION OF THE FIGURES

FIG. 7 is a schematic representation of a system;
FIGS. 8A and 8B are schematic representations of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
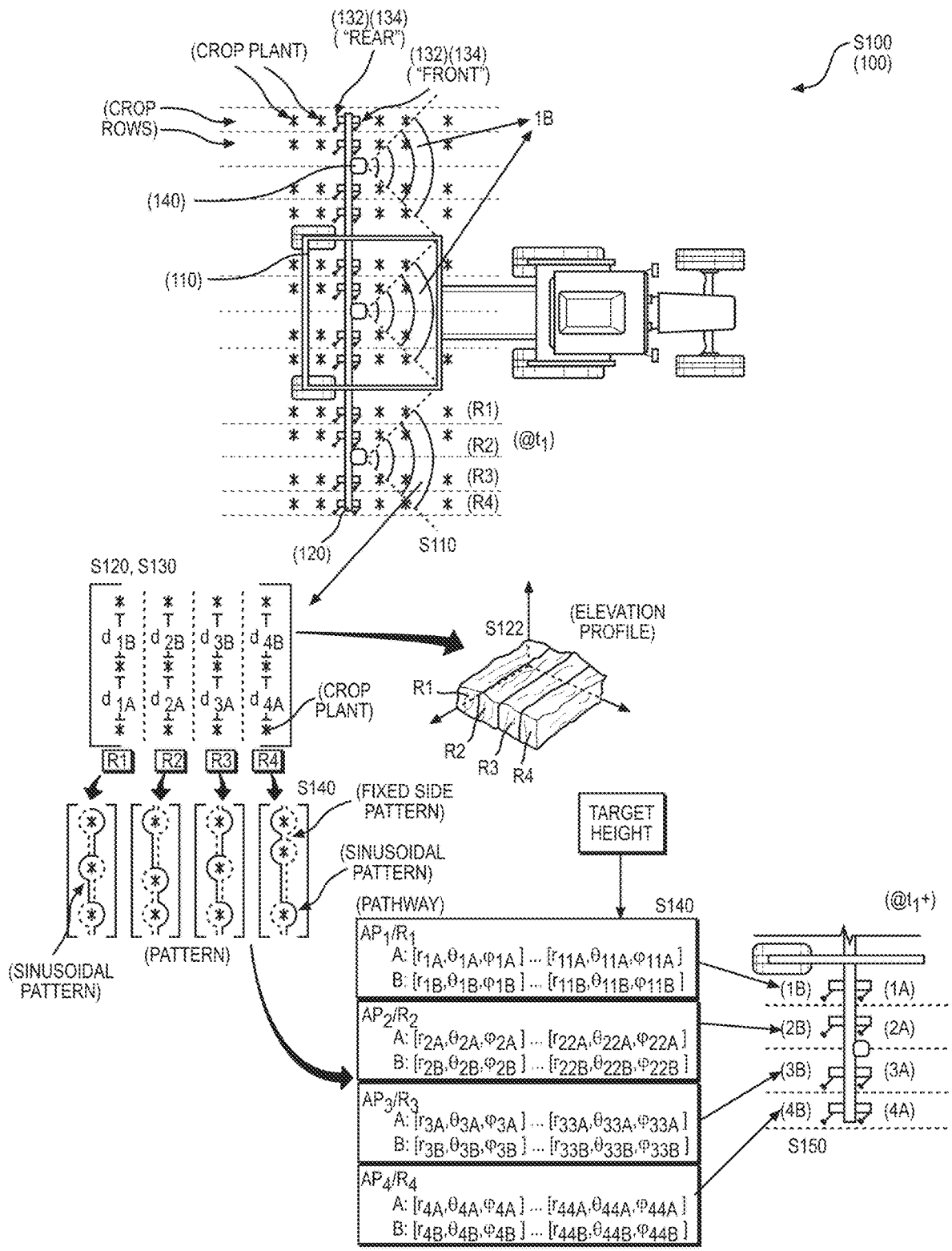
FIGS. 1A and 1B are flowchart representations of a method.
Figure 1B:
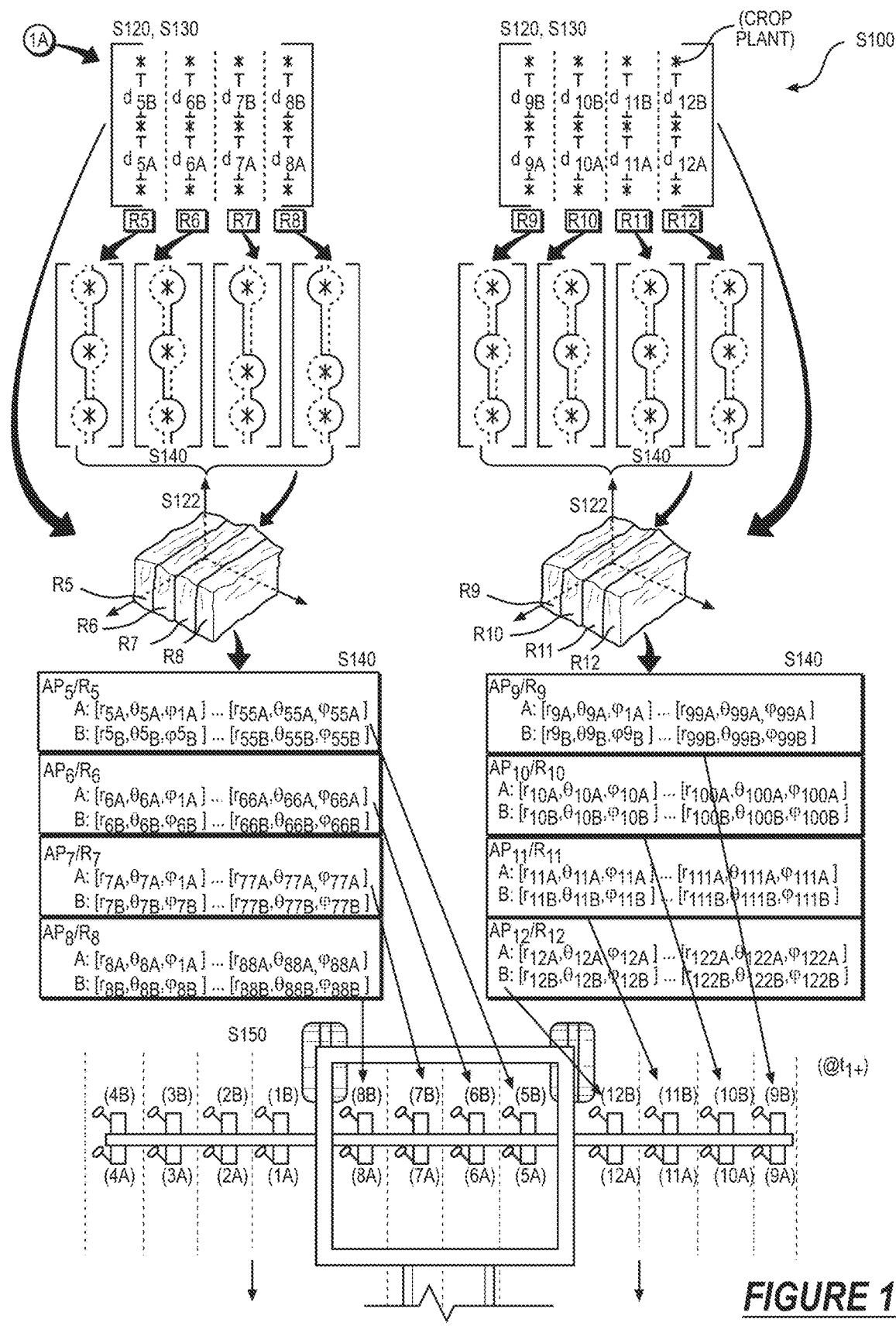
Figure 2:
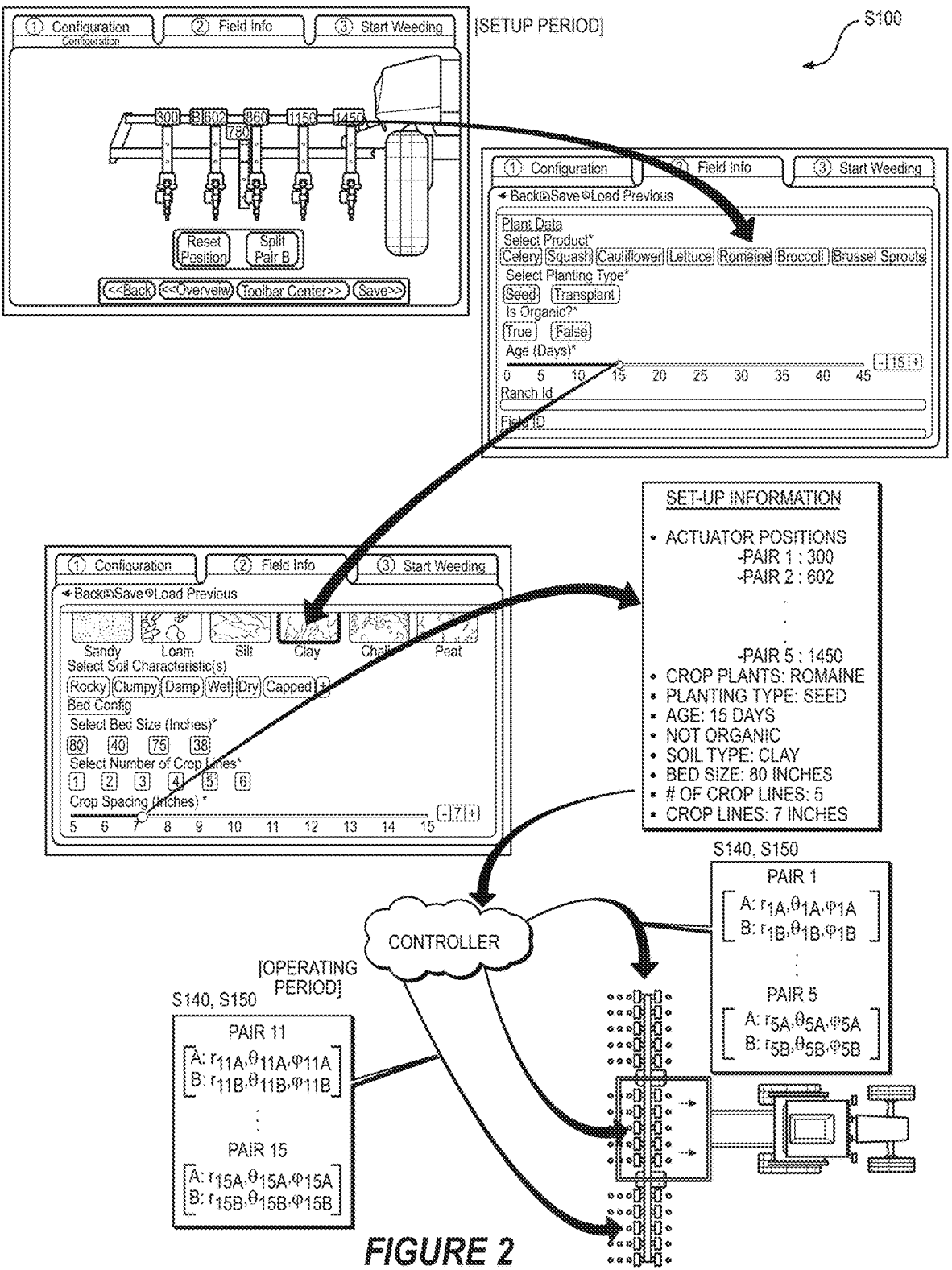
FIG. 2 is a flowchart representation of the method.
Figure 3:
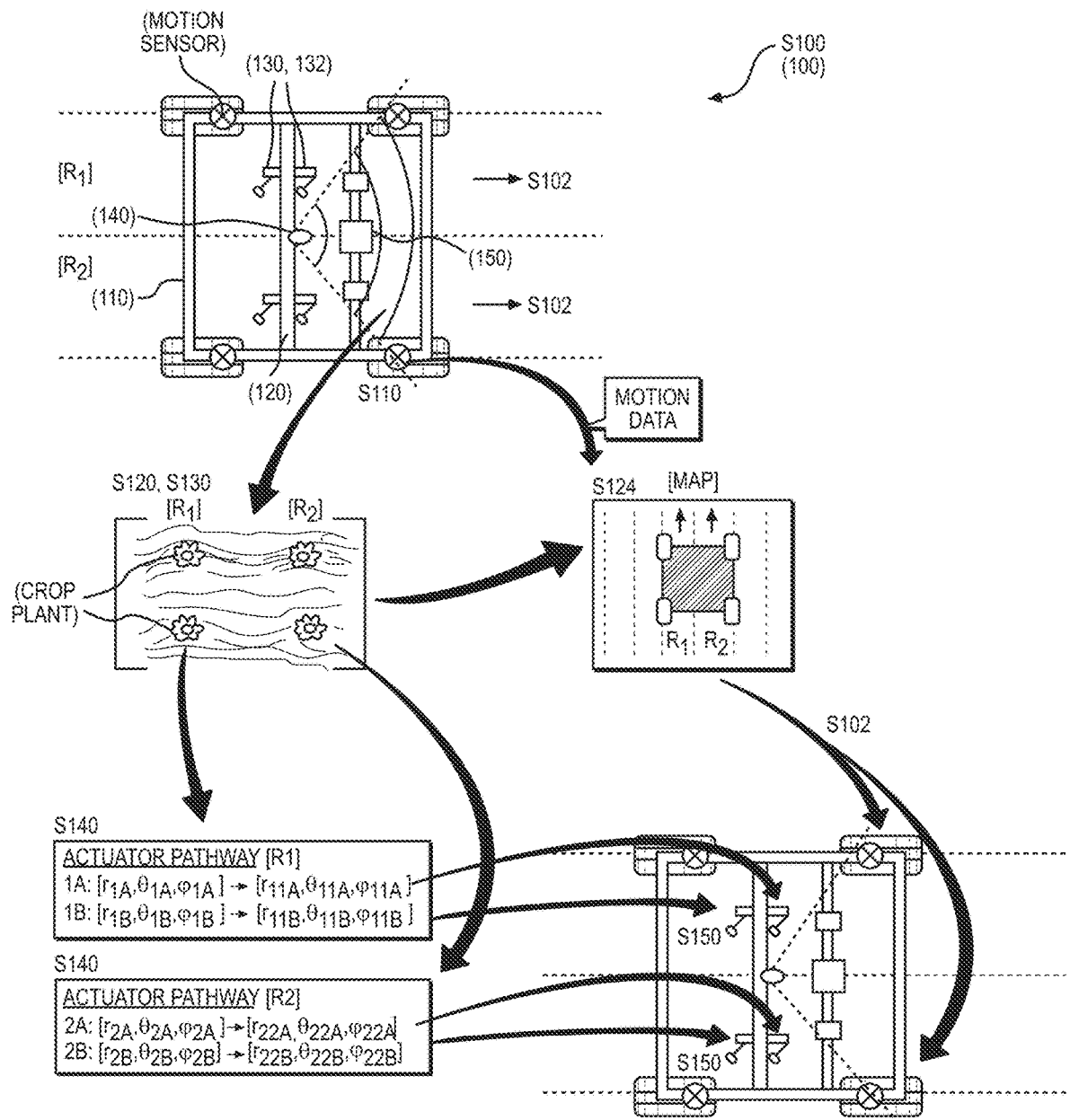
FIG. 3 is a flowchart representation of the method.
Figure 4:
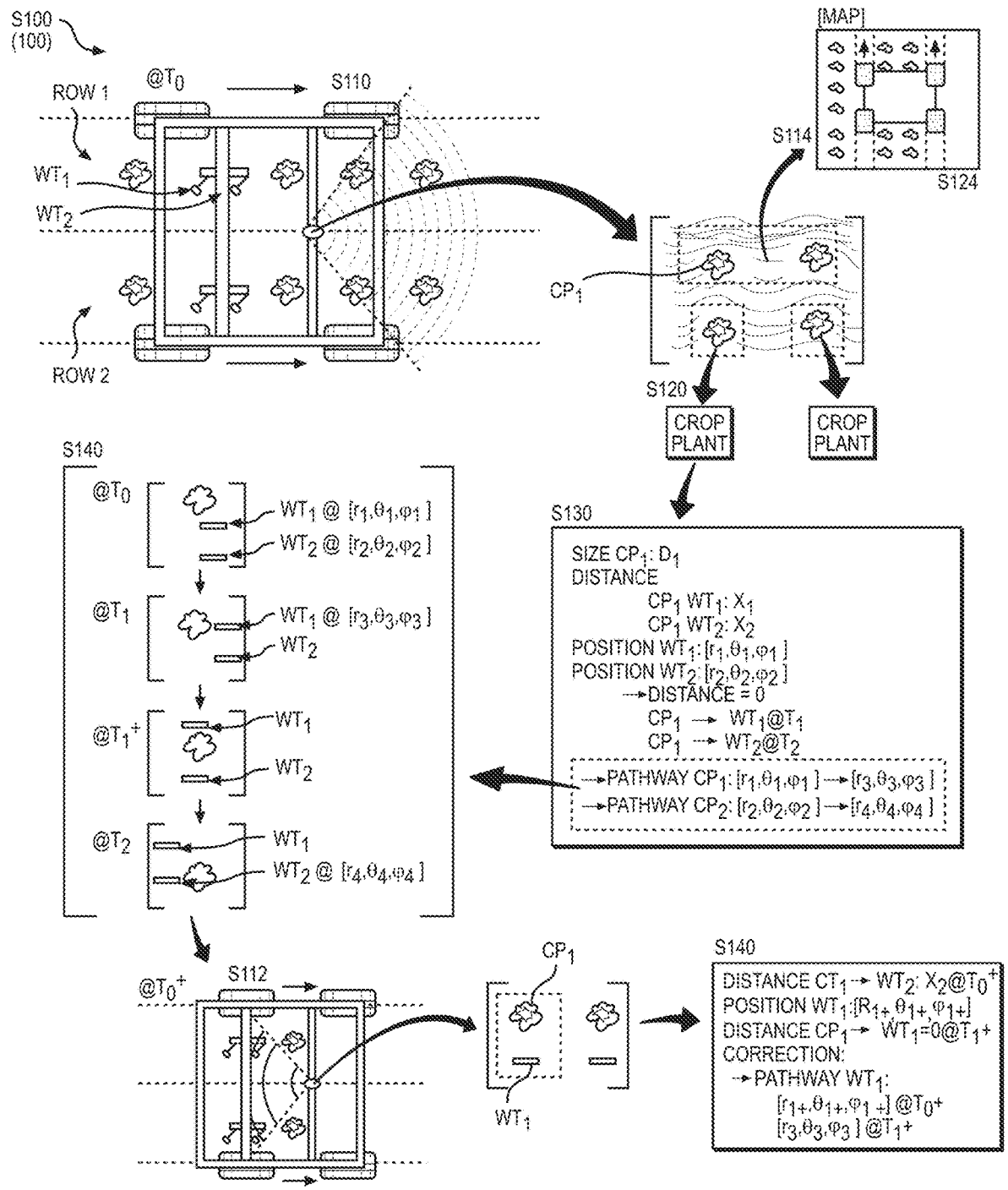
FIG. 4 is a flowchart representation of the method.
Figure 5:
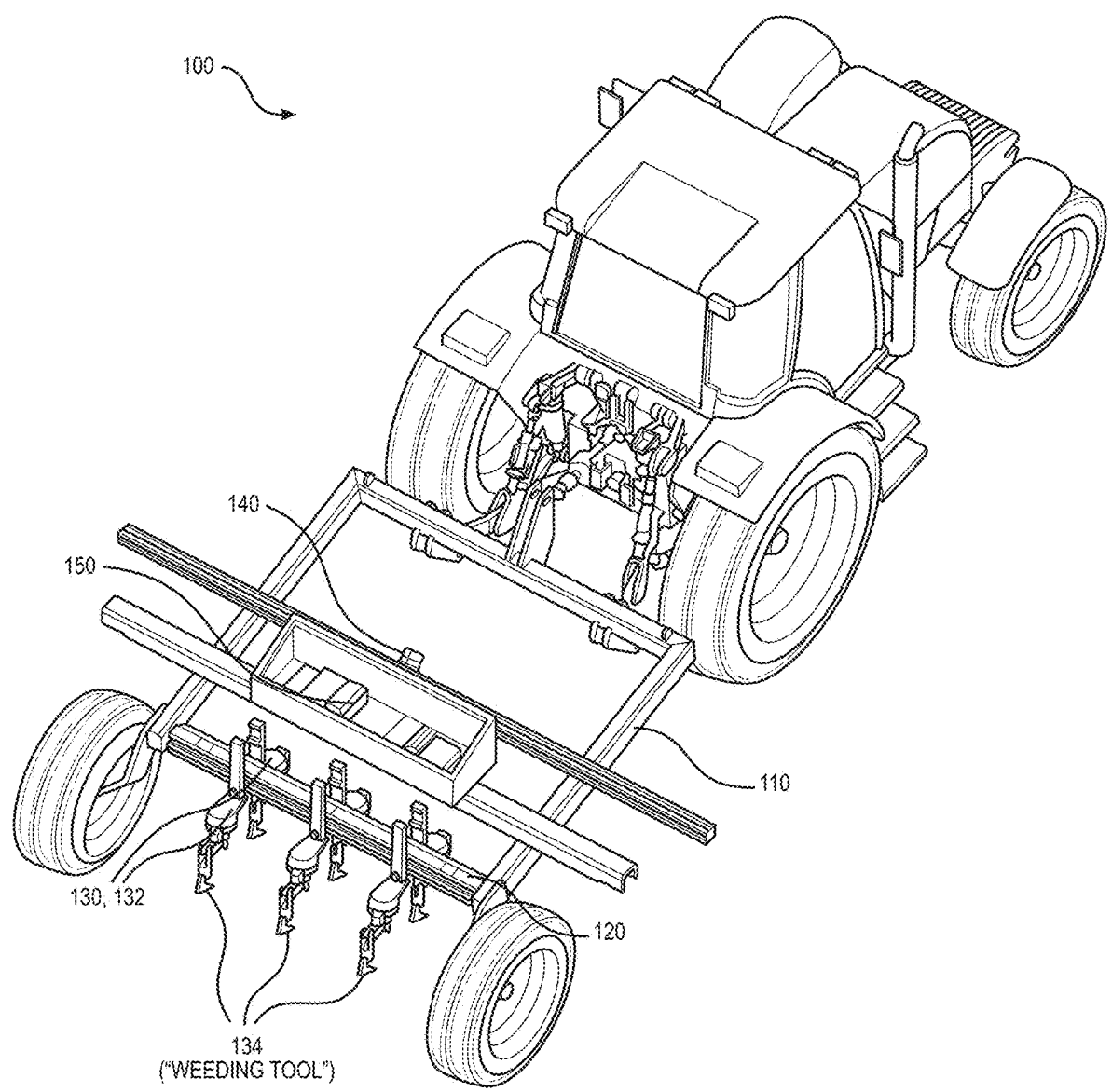
FIG. 5 is a schematic representation of a system.
Figure 9:
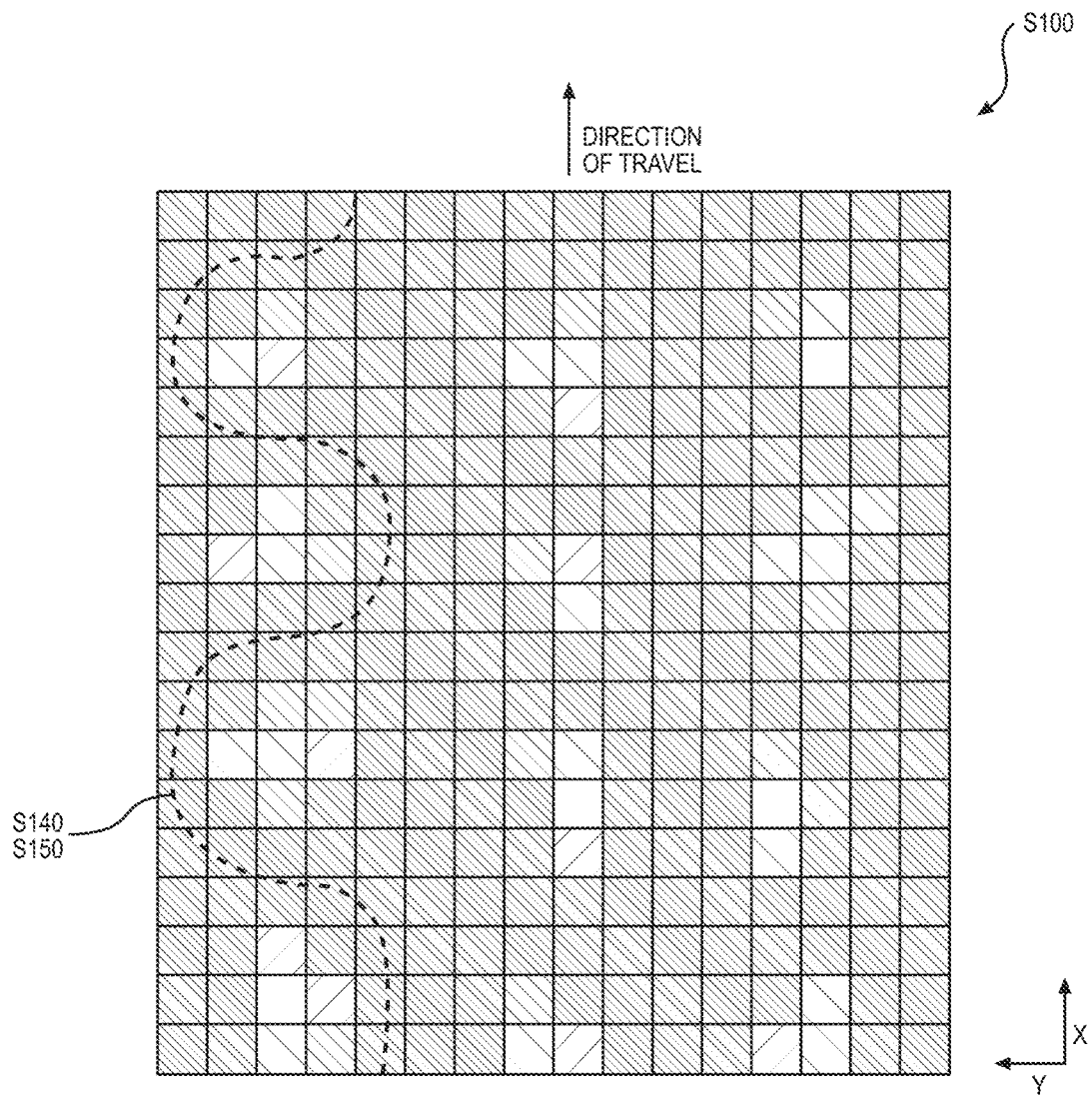
FIG. 9 is a flowchart representation of the method.
Figure 10:
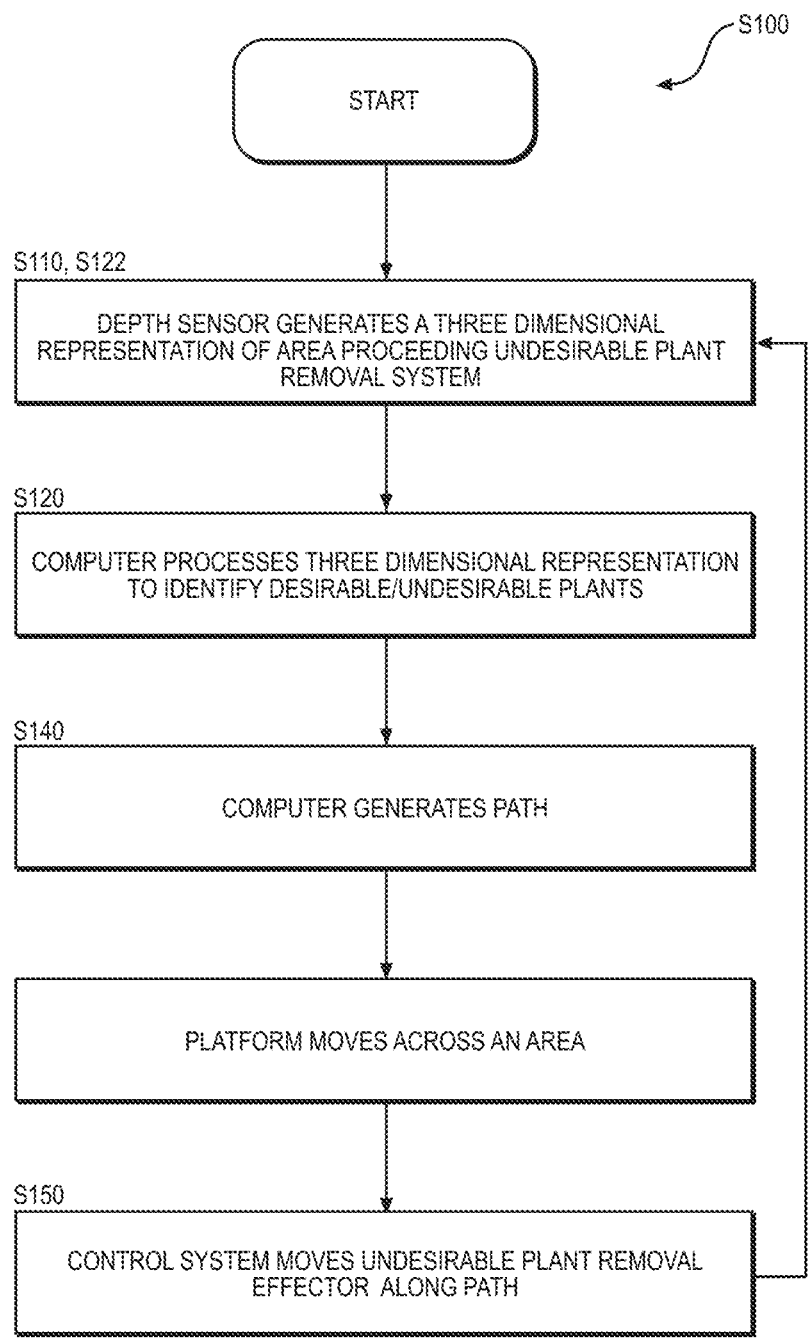
FIG. 10 is a flowchart representation of the method.

As shown in FIGS. 1A, 1B, 2-5, 9, and 10, a method S100 for weeding crops in an agricultural field includes, at a vehicle traversing the agricultural field: at an initial time, receiving a first image captured by a LIDAR sensor 140 integrated into a chassis 110 of the vehicle, arranged proximal a front of the vehicle, and defining a field of view intersecting a crop bed of the agricultural field, the first image captured by the LIDAR sensor 140 at approximately the initial time and depicting a first region of the crop bed spanning a first set of crop rows in Block S110; detecting presence of a first crop plant at a first location within a first crop row, in the set of crop rows, based on features extracted from the first image, the first location intersecting a longitudinal axis extending along the first crop row and a first lateral axis perpendicular the longitudinal axis in Block S120; deriving a first elevation profile for the first region of the crop bed based on features extracted from the first image in Block S122; estimating a first distance from the first crop plant to a first weeding tool 134, in a set of weeding tools 134, flexibly coupled to a rail 120 coupled to the chassis 110 proximal a rear of the vehicle, the first weeding tool 134 arranged at a first position on the rail 120 aligned to the first crop row in Block S130; deriving a first target pathway for the first weeding tool 134 based on the first distance and the first elevation profile in Block S140; estimating a second distance from the first crop plant to a second weeding tool 134, in the set of weeding tools 134, flexibly coupled to the rail 120 at the first position behind the first weeding tool 134 in Block S130; and deriving a second target pathway for the second weeding tool 134 based on the second distance and the first elevation profile in Block S140.

The method S100 further includes, in Block S150, driving the first weeding tool 134 across a first sequence of tool locations according to the first target pathway to: cut weeds behind and proximal the first crop plant; and locate the first weeding tool 134 on a first side of the first crop plant, offset the longitudinal axis, at the first lateral axis. The method S100 further includes, in Block S150, driving the second weeding tool 134 across a second sequence of tool locations according to the second target pathway to: cut weeds behind and proximal the first crop plant; and locate the second weeding tool 134 on a second side of the first crop plant, opposite the first side and offset the longitudinal axis, at the first lateral axis.

One variation of the method S100 includes, at a vehicle traversing the agricultural field: at an initial time, receiving a first image of a first region of a crop bed, spanning a first set of crop rows, located within a field of view of a LIDAR sensor 140 integrated within a chassis 110 of the vehicle, proximal a front of the vehicle, and defining a field of view intersecting a crop bed of the agricultural field, the first image captured by the LIDAR sensor 140 at approximately the initial time; detecting presence of a first crop plant at a first location within a first crop row, in the set of crop rows, based on features extracted from the first optical image; estimating a first distance from the first crop plant to a first weeding tool 134, in a set of weeding tools 134, flexibly coupled to the chassis 110 proximal a rear of the chassis 110; predicting intersection of the first weeding tool 134 and the first crop plant at a first time based on a speed of vehicle and the first distance; estimating a second distance from the first crop plant to a second weeding tool 134, in the set of weeding tools 134, flexibly coupled to the chassis 110 proximal the rear of the chassis 110; predicting intersection of the second weeding tool 134 and the first crop plant at a second time, succeeding the first time, based on the speed of the vehicle and the second distance; triggering actuation of the first weeding tool 134 according to a first target pathway configured to locate the first weeding tool 134 on a first side of the first crop plant at the first time; and triggering actuation of the second weeding tool 134 according to a second target pathway configured to locate the second weeding tool 134 on a second side of the first crop plant, opposite the first side, at the second time.

1.1 Method: Autonomous Vehicle Navigation

One variation of the method S100 includes, at an autonomous vehicle: autonomously navigating along a set of crop rows in an agricultural field in Block S102; at an initial time, receiving a first optical image—captured by the LIDAR sensor 140 at approximately the initial time—of a first region of a crop bed located within a first viewing window of a LIDAR sensor 140 facing a front of the autonomous vehicle and integrated within the autonomous vehicle in Block S110; deriving a map of the agricultural field based on a first set of features extracted from the first optical image in Block S124 and autonomously navigating according to the map; and detecting the presence of a first crop plant—at a first location within a first crop row in the set of crop rows—based on features extracted from the first optical image in Block S120. The method S100 further includes: calculating a first distance from the first crop plant to a first weeding tool 134, in a set of weeding tools 134, coupled to the chassis 110 and interposed between the LIDAR sensor 140 and a rear of the chassis 110 in Block S130; predicting intersection of the first weeding tool 134 and the first crop plant at a first time based on a speed of autonomous vehicle and the first distance; calculating a second distance from the first crop plant to a second weeding tool 134, in the set of wooding tools, coupled to the chassis 110 and interposed between the first weeding tool 134 and the rear of the chassis 110 in Block S130; predicting intersection of the second weeding tool 134 and the first crop plant at a second time, succeeding the first time, based on the speed of the autonomous vehicle and the second distance; triggering actuation of the first weeding tool 134 according to a first target pathway configured to locate the first weeding tool 134 on a first side of the first crop plant at the first time in Block S150; and triggering actuation of the second weeding tool 134 according to a second target pathway configured to locate the second weeding tool 134 on a second side of the first crop plant—opposite the first side—at the second time in Block S150.

One variation of the method S100 further includes: at a third time succeeding the initial time and preceding the first time, receiving a second optical image—captured by the LIDAR sensor 140 at approximately the third time—of the first region of the crop bed located within a second viewing window of the LIDAR sensor 140 facing the set of weeding tools 134 and opposite the front of the autonomous vehicle in Block S112; calculating a third distance from the first crop plant to the first weeding tool 134; predicting intersection of the first crop plant and the first weeding tool 134 at a fourth time, in replacement of the first time, based on the third distance; calculating a fourth distance from the first crop plant to the second weeding tool 134; predicting intersection of the first crop plant and the second weeding tool 134 at a fifth time, in replacement of the second time, based on the fourth distance; triggering actuation of the first weeding tool 134 according to a third target pathway configured to locate the first weeding tool 134 on the first side of the first crop plant at the fourth time; and triggering actuation of the second weeding tool 134 according to a fourth target pathway configured to locate the second weeding tool 134 on the second side of the first crop plant at the fifth time.

2. System

Figure 6A:
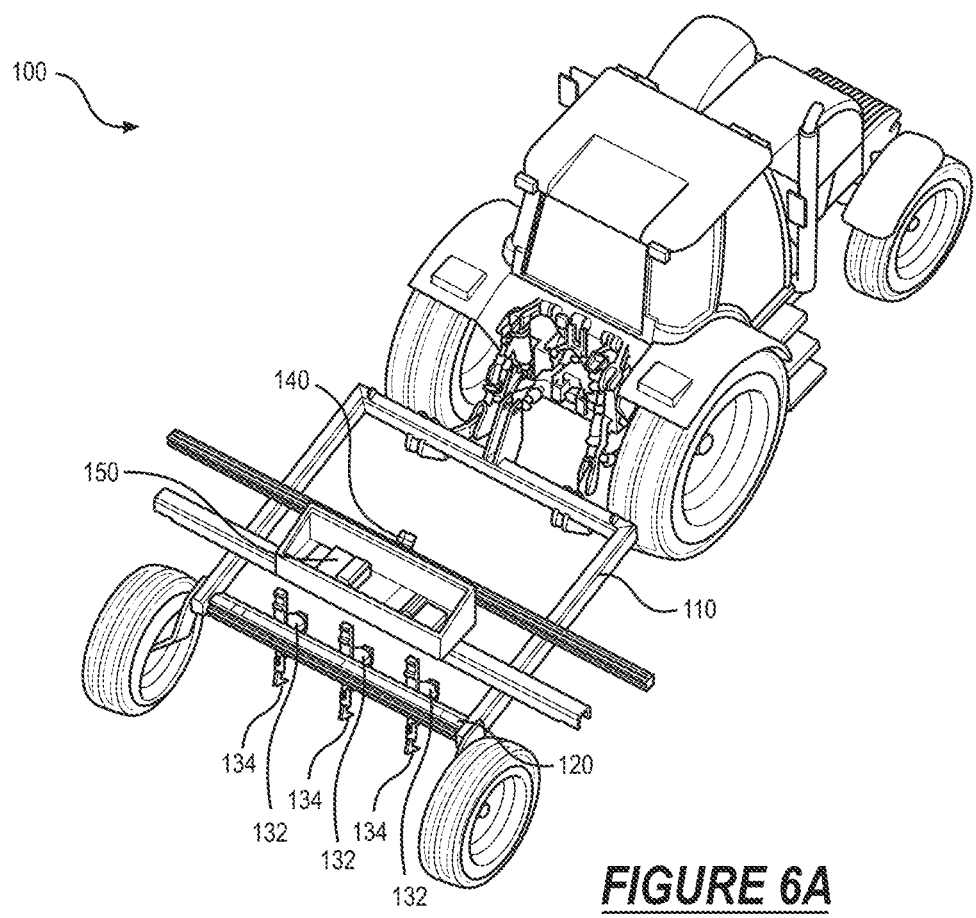
FIGS. 6A and 6B are schematic representations of the system.
Figure 6B:
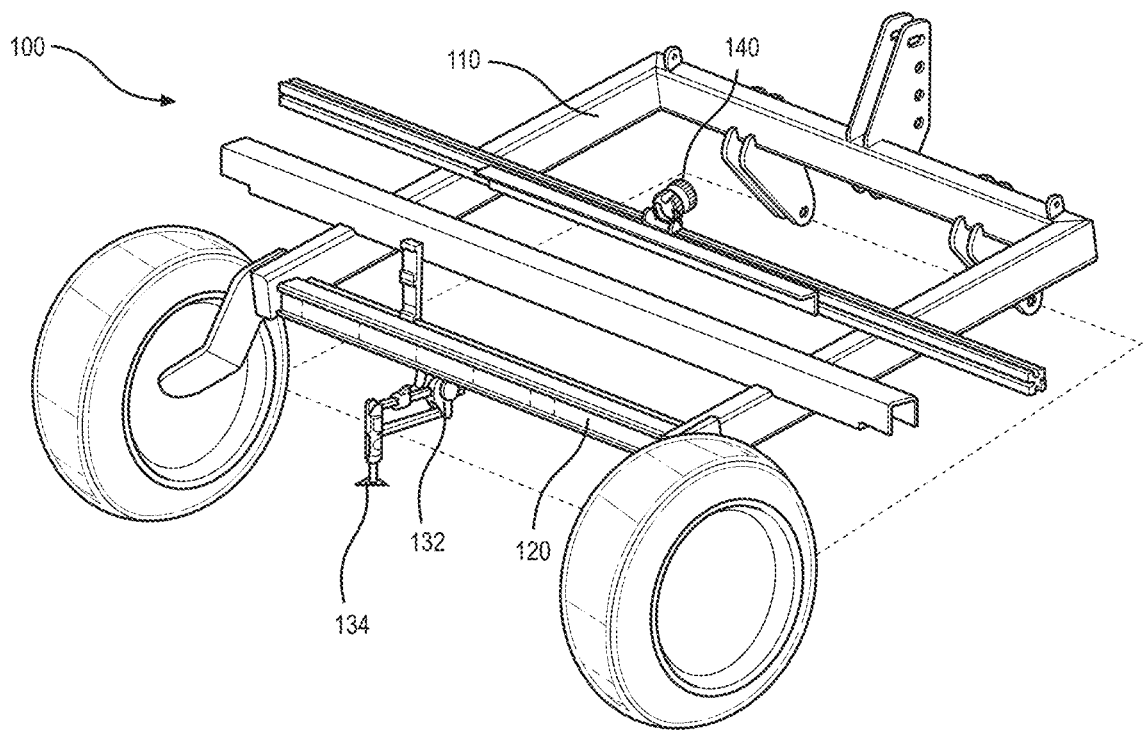

As shown in FIGS. 1A, 1B, 3-5, 6A, 6B, 7, 8A, and 8B, a system 100 for autonomously weeding crops in an agricultural field includes: a chassis 110 (e.g., a wheeled chassis) configured to traverse the agricultural field; a rail 120 coupled to the chassis 110 proximal a rear of the chassis 110; a set of actuator pairs 130 transiently installed on the rail 120 and configured to selectively execute a target action on plant matter in the crop bed; a set of LIDAR sensors 140; and a controller 150. The set of LIDAR sensors 140 include a first LIDAR sensor: installed within the chassis 110 proximal a front of the chassis 110; defining a field of view excluding the rail 120 and the set of actuator pairs 130 and spanning a set of crop rows within the crop bed; and configured to capture three-dimensional images of a crop bed of the agricultural field including plant matter. The controller 150 is configured to: receive an image captured by the first LIDAR sensor 140 and depicting a region of the crop bed spanning the set of crop rows; detect plant matter of a set of types present in the set of crop rows of the crop bed based on features extracted from the image; derive an elevation profile representing elevations of the crop bed across the region based on features extracted from the image; and selectively trigger the set of actuator pairs 130 to execute the target action based on detection of plant matter in the first set of crop rows and the elevation profile.

In one implementation, the set of actuator pairs 130 includes a first actuator pair 130 transiently mounted to the rail 120 at a first position aligned to a first crop row, in the set of crop rows. In this implementation, the first actuator pair 130 includes a first actuator 132 mounted to a front side of the rail 120 at the first position and a second actuator 132 mounted to a rear side, opposite the front side, of the rail 120 at the first position. The first actuator 132: includes a first weeding tool 134 configured to cut weeds present in topsoil within the crop bed; and is configured to drive the first weeding tool 134 along a first pathway to cut weeds within a first 180-degree semi-circular region about a crop plant present in the first crop row. The second actuator 132: includes a second weeding tool 134 configured to cut weeds present in topsoil within the crop bed; and is configured to drive the second weeding tool 134 along a second pathway to cut weeds within a second 180-degree semi-circular region, opposite the first 180-degree semi-circular region, about the crop plant.

In one variation, the system 100 includes: a chassis 110 configured to traverse the agricultural field; a rail 120 coupled to the chassis 110 proximal a rear of the chassis 110; a set of actuators 132 transiently installed on the rail 120 and configured to selectively execute a target action on plant matter in the crop bed; a set of LIDAR sensors 140; and a controller 150. The set of LIDAR sensors 140 include a first LIDAR sensor: installed within the chassis 110 proximal a front of the chassis 110; defining a field of view excluding the rail 120 and the set of actuator 132 and spanning a set of crop rows within the crop bed; and configured to capture three-dimensional images of a crop bed of the agricultural field including plant matter. The controller 150 is configured to: receive an image captured by the first LIDAR sensor 140 and depicting a region of the crop bed spanning the set of crop rows; detect plant matter of a set of types present in the set of crop rows of the crop bed based on features extracted from the image; derive an elevation profile representing elevations of the crop bed across the region based on features extracted from the image; and selectively trigger the set of actuators 132 to execute the target action based on detection of plant matter in the first set of crop rows and the elevation profile.

3. Applications

Generally, the system 100 for detection of plants within a crop bed and selective action on plants of different plant types (e.g., crop plants, weeds, "healthy" and/or "unhealthy" crop plants) includes: a sensor module including a set of optical sensors—including one or more LIDAR sensors 140—configured to capture optical images (e.g., a point cloud) depicting various plant matter and/or other matter (e.g., plants, weeds, soil) present in a crop bed of an agricultural field; an actuator module including a set of actuators 132 configured to selectively execute a target action (e.g., weeding, spraying a fertilizer or pesticide, thinning crops) on plants of a particular plant type; and a mobile chassis 110 (e.g., a wheeled chassis 110) configured to support the sensor module and the actuator module and to traverse the field. The system 100 further includes a controller 150 configured to: detect and classify plants of different plant types present in the agricultural field based on geospatial data collected by the set of optical sensors; and selectively trigger the set of actuators 132 to execute the target action on a particular plant.

In particular, the system 100 is configured to: detect plants and other matter present in the crop bed based on features extracted from optical images captured by one or more LIDAR sensors 140 coupled to the chassis 110; derive elevation profiles—representing elevation within regions of the crop bed—based on 3D data extracted from these optical images; derive pathways—such as according to a set of spherical coordinates (e.g., r, θ, φ spherical coordinates)—for the set of actuators 132 based on detection of plant matter at varying locations within the crop bed and based on the elevation profile of the crop bed; and selectively manipulate actuators 132 of the actuator module—according to derived actuator pathways—to execute actions on plants detected within the crop bed.

In one implementation, the system 100 can define a vehicle—transiently installed on, permanently integrated into, or towed behind a manually-operated farm vehicle (e.g., a manually-operated tractor or combine)—configured to autonomously remove weeds from topsoil of a crop bed spanning one or more contiguous crop rows (e.g., one crop row, two crop rows, five crop rows) within an agricultural field.

In particular, in this implementation, the system 100 can include a single LIDAR sensor 140 integrated within the chassis 110 of the vehicle and configured to capture three-dimensional (or "3D") optical images depicting regions of the crop bed ahead of the set of actuators 132. Furthermore, the system can include: a rail 120 extending laterally across the chassis 110, such as arranged (approximately) perpendicular crop rows of the agricultural field; a set of actuator pairs 130—including a first actuator pair 130 arranged in a first position on the rail 120 and a second actuator pair 130 arranged in a second position on the rail 120—transiently coupled to the rail 120; and a LIDAR sensor 140 integrated within the chassis 110—such as mounted to the rail 120 and/or directly mounted to the chassis 110—defining a field of view intersecting a crop bed of the agricultural field, spanning a set of crop rows, and/or excluding the set of actuator pairs 130, such that the field of view intersects a region of the crop bed directly ahead of (e.g., 1 meter, 5 meters, 20 meters) the set of actuator pairs 130 as the vehicle traverses the agricultural field.

In this implementation, the first actuator pair 130—arranged in the first position on the rail 120 aligned to a first crop row in the set of crop rows—can include: a first actuator 132—including a first weeding tool 134 (i.e., end effector 134) extending below the rail toward the crop bed—arranged in a front position (e.g., along a front side) on the rail 120; and a second actuator 132—including a second weeding tool 134 extending below the rail toward the crop bed—arranged in a rear position (e.g., along a rear side) opposite the front position on the rail 120. Furthermore, the second actuator pair 130—arranged in the second position on the rail 120 aligned to a second crop row in the set of crop rows—can include: a third actuator 132—including a third weeding tool 134 extending below the rail toward the crop bed—arranged in the front position on the rail 120; and a fourth actuator 132—including a fourth weeding tool 134 (extending below the rail toward the crop bed—arranged in the rear position on the rail 120.

Then, during operation, the controller 150 can: receive a three-dimensional image—captured by the LIDAR sensor 140—depicting a region of the crop bed spanning the first and second crop rows; derive an elevation profile for the region of the crop bed based on features extracted from the three-dimensional image; detect presence of a first crop plant (e.g., romaine, squash, cauliflower, lettuce) in the first crop row corresponding to a first cluster of pixels detected in the three-dimensional image; and detect presence of a second crop plant in the second crop row corresponding to a second cluster of pixels detected in the three-dimensional image. The controller 150 can then: leverage a known distance between the LIDAR sensor and the first actuator pair 130 on the rail 120—in combination with an estimated distance between the first crop plant and the LIDAR sensor 140—to estimate a first distance between the first crop plant and the first weeding tool 134 and estimate a second distance between the first crop plant and the second weeding tool 134; based on the first distance and the elevation profile, calculate a first actuator pathway—configured to enable cutting of weeds proximal the first crop plant, avoid cutting of the first crop plant, and maintain the first weeding tool 134 at a target height relative a surface of the crop bed—for the first weeding tool 134; and, based on the second distance and the elevation profile, calculate a second actuator pathway—configured to enable cutting of weeds proximal the first crop plant, avoid cutting of the first crop plant, and maintain the second weeding tool 134 at the target height—for the second weeding tool 134, such that the first and second actuator pathways cooperate to form an approximately 360-degree pathway about the first crop plant. The controller 150 can then repeat this process for the second actuator pair 130 to derive a third actuator pathway for the third weeding tool 134 and a fourth actuator pathway for the fourth weeding tool 134. Then, in (near) real-time, the controller 150 can simultaneously trigger actuation of the first, second, third, and fourth weeding tools 134—according to corresponding actuator pathways—to cut weeds about both the first crop plant in the first crop row and the second crop plant in the second crop row, without cutting the first and second crop plants.

The controller 150 can thus leverage 3D images captured by the LIDAR sensor 140 to detect and characterize plants (e.g., crop plants, weeds) present across multiple crop rows in the crop bed based on features extracted from these images—such as including crop bed elevations, spacing and/or alignment between objects at different elevations, size (e.g., width, diameter, radius) of objects at different elevations, etc.—and thus trigger the set of actuators 132 accordingly to remove weeds and/or avoid contact with crop plants detected in these images.

Furthermore, in one variation, the system 100 can include multiple LIDAR sensors 140 integrated within the mobile chassis 110, thereby enabling simultaneous detection of crop plants and/or other plant matter (e.g., weeds) across a wider array of crop rows (e.g., 10 crop rows, 15 crop rows, 50 crop rows) in the agricultural field. In particular, in this variation, the system 100 and/or controller 150 can: receive images from a suite of LIDAR sensors 140—such as arranged in parallel across the rail 120—defining a total field of view spanning an array of crop rows; detect crop plants and/or other plant matter at locations across the array of crop rows; and selectively trigger actuation of a suite of actuator pairs 130 transiently coupled to the rail 140—each actuator pair 130, in the set of actuator pairs 130, aligned to a particular crop row in the array of crop rows—according to actuator pathways defined for each of these actuator pairs 130 to selectively execute a target action (e.g., weeding, spraying fertilizer, spraying pesticide, thinning crops) on crop plants and/or other plant matter in each crop row in the array of crop rows.

4. Farm Vehicle

Generally, as described above, the system 100 can define a vehicle configured to traverse an agricultural field including an array of crop rows to autonomously weed crops—or execute any other target action (e.g., water, fertilize, weed, thinning crops)—in the agricultural field.

The vehicle can include: a chassis 110 (e.g., a wheeled chassis) configured to traverse the field; a rail 120 coupled to the chassis 110 proximal a rear of the chassis 110; a set of actuator pairs 130 transiently installed on the rail 120 and configured to selectively execute a target action on plant matter in the crop bed; a set of LIDAR sensors 140 (e.g., one LIDAR sensor, two LIDAR sensor, ten LIDAR sensors 140) integrated within the chassis 110 proximal a front of the vehicle; and a controller 150 configured to receive images from the set of LIDAR sensors 140 and selectively trigger actuation of the set of actuator pairs 130 accordingly.

In particular, the set of LIDAR sensors can include a first LIDAR sensor: installed within the chassis 110 proximal a front of the chassis 110; defining a field of view excluding the rail 120 and the set of actuator pairs 130 and spanning a set of crop rows within the crop bed; and configured to capture three-dimensional images of a crop bed of the agricultural field including plant matter. The controller 150 can be configured to: receive an image captured by the first LIDAR sensor 140 and depicting a region of the crop bed spanning the set of crop rows; detect plant matter of a set of types present in the set of crop rows of the crop bed based on features extracted from the image; derive an elevation profile representing elevations of the crop bed across the region based on features extracted from the image; and selectively trigger the set of actuator pairs 130 to execute the target action based on detection of plant matter in the first set of crop rows and the elevation profile.

In one implementation, the system 100 can define a vehicle configured to be transiently installed on, permanently integrated into, or towed behind a manually-operated farm vehicle, such as a manually-operated tractor or combine. In each of these implementations, the system 100 can include: a mobile chassis 110 (e.g., a wheeled chassis); a sensor module—including one or more LIDAR sensors 140—configured to transiently and/or semi-permanently mount on the mobile chassis 110; an actuator module configured to mount on a rear of the mobile chassis 110 and including a row of actuators 132; and a controller 150 configured to install on the mobile chassis 110 and to communicatively couple to the sensor and actuator modules. For example, the sensor module, the actuator module, and/or the controller 150 can be powered via wired connections to a power (and data) bus integrated into the vehicle. Alternatively, the sensor module, the actuator module, and/or the controller 150 can include electrical generators configured to engage mechanical power-takeoff drives arranged throughout the farm vehicle.

Alternatively, in one implementation, the system 100 can define a manually-driven vehicle, such as including a drive unit—including a set of motors and/or controllers 150—configured to propel the manually-driven vehicle forward through the field (e.g., responsive to inputs by an operator of the vehicle). For example, the system 100 can define a manually-operated farm vehicle, such as a manually-operated tractor or combine.

4.1 Variation: Autonomous Farm Vehicle

In one variation, the system 100 can define an autonomous farm vehicle configured to autonomously navigate through an agricultural field (or "field").

In one implementation, the autonomous farm vehicle can include: a chassis 110 (e.g., a wheeled or tracked chassis 110); a drive unit—including a set of motors and/or controllers 150—configured to propel the autonomous farm vehicle forward through the field; a set of geospatial position sensors and/or motion sensors; and a set of optical sensors (e.g., a LIDAR sensor, a color camera)—including a set of LIDAR sensors 140 (e.g., one or more LIDAR sensors 140)—configured to output optical images (e.g., a 3D cloud point, a color image) from which the autonomous farm vehicle can detect nearby obstacles and/or localize itself within a scene, etc. In particular, the chassis 110 can be configured to support: a sensor module including the set of optical sensors; and an actuator module including a set of actuator pairs 130—arranged in a row and spaced according to a crop row pitch of crops rows within the field—configured to selectively execute target actions on plants in a particular crop row.

Further, the autonomous farm vehicle can include a controller 150 coupled to the sensor module and the actuator module and configured to track a location of the mobile chassis 110 within the field based on geospatial data collected by the set of optical sensors for autonomous navigation of the mobile chassis 110 within the field. In particular, in this variation, the controller 150 can: track the location of the chassis 110 based on data captured by the geospatial position and/or motion sensors; selectively capture positional data (e.g., 3D elevation data) representative of a profile (e.g., an elevation profile) of the crop bed—such as including crop plants, weeds, soil, etc.—via the set of LIDAR sensors 140; construct a 3D crop map (hereinafter "crop map") of the crop bed and plants occupying the crop bed based on data captured by the set of LIDAR sensors 140; detect and/or predict presence of crop plants, weeds, etc. within the crop bed based on this crop map; estimate and/or detect proximity of detected plants to a particular actuator 132 and/or actuator pair 130; and selectively trigger the set of actuator pairs 130 to manipulate plants (e.g., crop plants, weeds) based on characteristics (e.g., a plant type) of these plants and proximity to the set of actuators 132.

5. Actuator Module

Generally, the actuator module includes: a rail 120 coupled to a bottom surface of the chassis 110; and a set of actuators 132 transiently coupled to the rail 120 and configured to selectively execute an action on a detected plant (e.g., a crop plant, a weed). Each actuator 132, in the set of actuators 132, can include a particular tool (i.e., an end effector 134) configured to selectively execute an action on a target plant. For example, the actuator 132 can include: a weeding tool 134 configured to cull a target plant (e.g., a weed, a damaged plant); a sprayer tool configured to selectively apply fertilizer, pesticide, and/or herbicide to a target plant; a watering tool configured to selectively apply water to a target plant; etc. Each actuator 132, in the set of actuators 132, can then be configured to drive the attached tool along a particular pathway—such as according to a set of spherical coordinates (e.g., $r$, $\theta$, $\varphi$ spherical coordinates)—to locate the tool in a particular position and/or orientation relative a target plant.

In one implementation, the actuator module can include: a rail 120 affixed to a bottom surface of the farm vehicle; a first row of actuators 132 transiently coupled to a front side of the rail 120 facing a front of the farm vehicle, each actuator 132, in the first row of actuators 132, offset each adjacent actuator 132, in the first row of actuators 132, by a target spacing corresponding to a defined crop row spacing of crop rows; and a second row of actuators 132 transiently coupled to a rear side of the rail 120—opposite the front side—facing a rear of the farm vehicle, each actuator 132, in the second row of actuators 132. In this implementation, each actuator 132, in the second row of actuators 132, can be configured to align longitudinally (e.g., along an axis extending from the front of the farm vehicle to the rear of the farm vehicle) on the rail 120 with a particular actuator 132 in the first row of actuators 132—and therefore align to a corresponding crop row—to form an actuator pair 130, in a set of actuator pairs 130.

For example, the actuator module can include a first actuator pair 130: transiently mounted to the rail 120 at a first position aligned to a target crop row (e.g., such that the first actuator pair 130 seats directly above the target crop row); and configured to remove weeds in the target crop row and avoid contact with crop plants. In this example, the first actuator pair 130 can include a first actuator 132: mounted to the front side of the rail 120 at the first position; including a first weeding tool 134 (e.g., a blade) configured to cut weeds present in topsoil within the crop bed; and configured to drive the first weeding tool 134 along a first pathway—such as according to a sequence of position coordinates (e.g., x,y,z Cartesian coordinates; r, θ, φ spherical coordinates) specified by the controller 150—to remove weeds within a first 180-degree semi-circular region about a crop plant in the first crop row. The first actuator pair 130 can further include a second actuator 132: mounted to the rear side of the rail 120 at the first position; including a second weeding tool 134 configured to cut weeds present in topsoil within the crop bed; and configured to drive the second weeding tool 134 along a second pathway to remove weeds within a second 180-degree semi-circular region about the crop plant opposite the first 180-degree semi-circular region. The first actuator 132 and the second actuator 132 can therefore cooperate to drive the first and second weeding tools 134 along the first and second pathways to remove weeds within a complete 360-degree region (e.g., a torus-shaped region) surrounding the crop plant. Similarly, the actuator module can include: a second actuator pair 130 configured to remove weeds in a second crop row and avoid contact with crop plants; a third actuator pair 130 configured to remove weeds in a third crop row and avoid contact with crop plants; etc.

In the preceding implementation, each actuator pair 130, in the set of actuator pairs 130, can be aligned on the rail 120, such that each actuator 132 of the actuator pair 130 is arranged at approximately the same position (e.g., lateral position) on the rail 120 aligned to a particular crop row. For example, the system 100 can include: a first actuator pair 130—including a first actuator 132 mounted to the front side of the rail 120 and a second actuator mounted to the rear side of the rail 120—transiently installed at a first position (e.g., lateral position) on the rail 120; and a second actuator pair 130—including a third actuator 132 mounted to the front side of the rail 120 and a fourth actuator mounted to the rear side of the rail 120—transiently installed at a second position (e.g., lateral position) on the rail 120 offset from the first position.

Additionally or alternatively, a set of actuators 132—forming an actuator pair 130—can be arranged at offset positions on the rail 120, while maintaining alignment with a particular crop row. For example, the system 100 can include a first actuator pair 130—aligned to a first crop row in a set of crop rows of an agricultural field—including: a first actuator 132 mounted to the front side of the rail 120 at a first position on the rail 120; and a second actuator mounted to the rear side of the rail 120 at a second position—offset the first position by a distance approximating (e.g., within five percent, ten percent, twenty percent) and/or less than a width of the first crop row—on the rail 120. In this example, by staggering the first and second actuators 132 on the rail 120, the first and second actuators 132 can cooperate to execute a target action (e.g., cutting weeds) on target plants (e.g., weeds) present across the width of the first crop row, such as via the first actuator 132 on a first side of the crop row and the second actuator 132 on a second side of the crop row, wherein the first and second sides combine to span the width of the first crop row. Therefore, in this example, the first actuator 132 can be aligned to the first side of the first crop row at the first position on the rail 120 and the second actuator 132 can be aligned with the second side of the first crop row at the second position on the rail 120, thereby requiring actuation of the first and second actuators 132 across a smaller area and/or reducing a required reach of each of the first and second actuators 132.

Alternatively, in one implementation, the actuator module can include a single row of actuators 132 transiently coupled to the rail 120. In particular, in this implementation, the actuator module can include: a rail 120 affixed to a bottom surface of the farm vehicle and/or chassis 110; a row of actuators 132 transiently coupled to the rail 120, each actuator 132, in the row of actuators 132, offset each adjacent actuator 132, in the row of actuators 132, by a target spacing corresponding to a defined crop row spacing of crop rows. In this implementation, each actuator 132, in the row of actuators 132, can be configured to align with a corresponding crop row, in a set of crop rows, such that the actuator 132—in combination with an end effector 134 (e.g., a cutting tool, a sprayer) coupled to the actuator 132—can execute a target action on plant matter (e.g., crop plants, weeds) present in the corresponding crop row.

Furthermore, in one implementation, each actuator 132 can include an encoder coupled to the attached tool (e.g., weeding tool 134, spraying tool) and configured to output a signal representing position and/or movement of the attached tool. For example, each actuator 132 of the actuator module can include an encoder—coupled to a weeding tool 134 attached to the actuator 132—configured to output a signal representing position, orientation, and/or speed of the weeding tool 134. The controller 150 can therefore: read this signal output by the encoder; and interpret position, orientation, and/or speed of the weeding tool 134 accordingly, such as in (near) real time during actuation of the vehicle (or mobile chassis 110) through a field.

6. Sensor Module

The system 100 includes a sensor module including a set of optical sensors transiently mounted to and/or integrated into the chassis 110. The controller 150 can leverage data captured by the set of optical sensors to both: localize the system 100 and/or autonomously navigate the system 100 accordingly; and detect plants within the crop bed.

Generally, the sensor module can include a set of LIDAR sensors 140 configured to selectively capture 3D positional data representing a profile (e.g., an elevation profile) of the crop bed. Additionally or alternatively, the sensor module can include a set of 3D depth sensors of any type—such as including one or more LIDAR sensors, one or more time-of-flight sensors (or "ToF sensors" or "ToF cameras"), one or more stereo vision cameras, etc.—configured to selectively capture 3D positional data representing the profile (e.g., an elevation profile) of the crop bed. The controller 150 can therefore leverage this 3D positional data to predict presence of plants (e.g., crop plants, weeds) based on linking of changes in the crop bed profile to presence of plants of one or more plant types. Additionally, in one variation, the sensor module can further include a set of cameras—such as a color camera(s), a multispectral camera(s), a monochromatic camera(s)—paired with the set of LIDAR sensors 140. In this variation, the controller 150 can access images (e.g., color images, multispectral images, monochromatic images—captured by the set of cameras and data captured by the set of LIDAR sensors 140 to predict and/or confirm presence of plants of specific plant types within the crop bed.

The system 100 is generally described below as including a set of LIDAR sensors (e.g., one or more LIDAR sensors) configured to capture three-dimensional images of a crop bed of the agricultural field. However, as described above, the system 100 can include a set of 3D depth sensors (e.g., one or more depth sensors) of any type, such as including a ToF camera, a stereo vision camera, a LIDAR sensor, etc.

In one implementation, the sensor module includes one optical sensor arranged over or otherwise facing a set of crop rows (e.g., two, three, five crop rows). For example, the sensor module can include a first optical sensor facing a first and second crop row. In this example, the controller 150 can leverage data collected by the first optical sensor to interpret presence of plants within both the first crop row and the second crop row. Alternatively, in another implementation, the sensor module includes one optical sensor arranged over or otherwise facing a single crop row of the field. For example, the sensor module can include: a first optical sensor arranged over a first crop row in the field; and a second optical sensor arranged over a second crop row in the field. In this example, the controller 150 can: access data captured by the first optical sensor to interpret presence of plants within the first crop row; and access data captured by the second optical sensor to interpret presence of plants within the second crop row.

6.1 Single LIDAR Sensor

In one implementation, the sensor module can include a (single) LIDAR sensor 140 transiently and/or semi-permanently mounted to the chassis 110. Generally, in this implementation, the LIDAR sensor 140 can define a field of view intersecting the crop bed and excluding the rail 120, the set of actuator pairs 130 transiently mounted to the rail 120, and/or a set of weeding tools 134 (e.g., included in the set of actuator pairs 130).

In this implementation, the controller 150 can: selectively trigger the LIDAR sensor 140 to capture 3D optical images (e.g., a point cloud) containing 3D positional data representative of an elevation profile of a region of the crop bed within a field of view of the LIDAR sensor; leverage a first subset of features extracted from 3D optical images to predict presence of plants at particular locations within the crop bed; and leverage a second subset of features extracted from 3D optical images—in combination with geospatial data collected by the set of geospatial and/or motion sensors—to derive a 3D map of the field and/or localize the system 100 within the field. For example, the controller 150 can implement simultaneous localization and mapping techniques (or "SLAM" techniques) to construct a 3D georeferenced map of the field. The controller 150 can therefore leverage a single image captured by this single LIDAR sensor 140 to both detect plants within the crop bed and autonomously navigate the system 100 through the field.

In particular, the system 100 can include a LIDAR sensor 140 defining a field of view excluding the rail 120, the set of actuators 132, and/or the set of end effectors 134 (e.g., weeding tools 134), such that LIDAR sensor 140 captures images of the crop bed immediately ahead of the rail 120 within the set of crop rows as the chassis 110 and/or vehicle traverses the set of crop rows within the agricultural field. The controller 150 can then leverage data extracted from these images—depicting the crop bed ahead of the rail 120 and therefore ahead of the set of end effectors 134—to selectively actuate the set of actuators 132 and thus drive the set of end effectors 134 according to particular tool pathways to execute a target action (e.g., cutting weeds, spraying crop plants, thinning crops), such as without requiring images of the set of end-effectors and therefore without requiring implementation of closed-loop controls.

However, in one variation, the system can include a LIDAR sensor 140 defining a field of view that includes the rail 120, the set of actuators 132, and/or the set of end effectors 134.

6.1.1 Below Chassis

In one implementation, the sensor module can include a LIDAR sensor 140 arranged below and/or within the chassis 110, such that the LIDAR sensor 140 defines a field of view intersecting a region of the crop bed beneath the chassis 110 during deployment in a field.

Generally, in this implementation, the chassis 110 may obstruct the field of view of the LIDAR sensor 140 and thus limit a detection range (e.g., distance, radius, circumference) of the LIDAR sensor. However, by locating the LIDAR sensor 140 below the chassis 110, the LIDAR sensor 140 can be configured to capture relatively high-resolution positional data—such as represented by a high point-density point cloud—for the region of the crop bed within the field of view, such as directly in front of the set of actuators 132. In this implementation, the controller 150 can therefore: access high-resolution positional data captured by the LIDAR sensor 140 such as immediately before a target plant passes below the set of actuators 132; predict presence and location of the target plant with increased confidence; and selectively trigger the set of actuators 132 to execute an action on the target plant within a narrow time window calculated with increased accuracy and with minimum latency between detection of the target plant and execution of the action.

6.1.2 Above Chassis

Alternatively, in one implementation, the sensor module can include a LIDAR sensor 140 arranged above the chassis 110, such that the LIDAR sensor 140 defines a field of view intersecting the chassis 110 and a region of the crop bed surrounding the chassis 110—such as immediately in front of, adjacent, and/or behind the chassis 110—while excluding a region of the crop bed directly below the chassis 110.

In particular, in this implementation, the LIDAR sensor 140 can define a field of view extending a distance (e.g., 10 meters, 50 meters, 100 meters) outward from the chassis 110. For example, the LIDAR sensor 140 can be configured to capture an optical image depicting a first plant located immediately in front of the chassis 110 and depicting a second plant located 50 meters in front of the chassis 110. However, by locating the LIDAR sensor 140 above the chassis 110, the chassis 110 may obstruct the LIDAR sensor 140 from capturing positional data for a region of the crop bed directly below the chassis 110, thereby obstructing the LIDAR sensor 140 from capturing positional data for a target plant during plant entry, execution of an action on the target plant, and/or during plant exit.

6.1.3 Variation: Rotating LIDAR Sensor 140

In one variation, the LIDAR sensor 140 can be arranged beneath the chassis 110 and configured to rotate about its axis (e.g., 360 degrees) and therefore define a dynamic field of view. In this variation, the LIDAR sensor 140 can capture optical images—containing high-resolution 3D positional data—of plants in the crop bed during plant entry (e.g., beneath the chassis 110), execution of the action by the set of actuators 132, and plant exit (e.g., from beneath the chassis 110). The controller 150 can therefore: access high-resolution positional data captured by the LIDAR sensor 140 such as immediately before a target plant passes below the set of actuators 132 (e.g., during plant entry), during execution of an action by the set of actuators 132, and immediately after the target plant passes below the set of actuators 132 (e.g., during plant exit); and leverage these high-resolution positional data to more accurately detect and track a location of a target plant, relative the set of actuators 132, and confirm execution of the action on the target plant.

In particular, in one implementation, a single LIDAR sensor 140—such as a 360-degree LIDAR sensor 140 configured to output a 3D point cloud—can be integrated within the chassis 110 toward or at a front of the autonomous farm vehicle and configured to rotate about its axis to capture 3D images within a dynamic field of view defining: a forward-facing view—defined by the LIDAR sensor 140 in a forward-facing position—including a region of the crop bed directly ahead of the chassis 110, such as up to 5 meters, 10 meters, 50 meters, etc. in front of the autonomous farm vehicle; and a rear-facing view—defined by the LIDAR sensor 140 in a rear-facing position—including a region of the crop bed directly beneath the chassis 110—excluding a subregion directly beneath the LIDAR sensor 140—and including the set of actuators 132. The controller 150 can thus: access a forward-facing 3D image (e.g., a first point cloud) captured by the LIDAR sensor 140 in the forward-facing position and depicting a first region of the crop bed extending ahead of the autonomous farm vehicle within the agricultural field; split the forward-facing 3D image into a first image depicting plants immediately ahead (e.g., within 1 meter) of the LIDAR sensor 140 and a second image depicting a remainder of the first region of the crop bed extending ahead of the autonomous farm vehicle bed; leverage the second image to localize the autonomous farm vehicle within the agricultural field; leverage the first image to detect a crop plant present at a first position in the crop bed directly ahead of the LIDAR sensor; predict a future location(s) and/or time(s) at which the crop plant will align with the set of actuators 132 arranged behind the LIDAR sensor 140 (e.g., toward a rear of the autonomous farm vehicle) and extending below the chassis 110; and trigger the set of actuators 132 to occupy a target position—such as arranged laterally the crop plant—at the predicted time to avoid contact with the crop plant while continuing to remove weeds directly in front of, behind, and/or adjacent the crop plant.

Further, at the predicted time, the LIDAR sensor 140—in the rear-facing position—can capture a rear-facing 3D image depicting the set of actuators 132 and a second region of the crop bed behind the LIDAR sensor 140 and/or beneath the set of actuators 132. The controller 150 can therefore leverage this rear-facing 3D image to: confirm whether the set of actuators 132 occupied the target position at the scheduled time; confirm whether the set of actuators 132 avoided contact with the crop plant; and implement closed-loop controls to calculate time and position corrections for maneuvering the set of actuators 132, and thus remove weeds proximal a next crop plant within the crop row with greater confidence and higher accuracy while avoiding contact between the set of actuators 132 and this next crop plant.

6.3 Variation: Multiple LIDAR Sensors

In one variation, the sensor module can include multiple LIDAR sensors 140 arranged on the chassis 110 and configured to capture 3D positional data for the crop bed.

In one implementation, the sensor module can include: a first LIDAR sensor 140 arranged above the chassis 110, such as mounted to an upper surface of the chassis 110; and a second LIDAR sensor 140 arranged below the chassis 110, such as mounted to a lower surface of the chassis 110, opposite the upper surface, and interposed between a front of the chassis 110 and the rail 120 of the actuator module. In particular, in this implementation: the first LIDAR sensor 140 can define a first field of view—such as a static or dynamic (e.g., rotating) field of view—extending outward from the chassis 110; and the second LIDAR sensor 140 can define a second field of view intersecting a region of the crop bed directly below the chassis 110. Therefore, during operation, the controller 150 can: access optical images (e.g., point clouds)—containing 3D positional data—of the crop bed (e.g., including plants) captured by the first LIDAR sensor 140 to localize the system 100 within the field and/or detect approaching plants in the crop bed; and access optical images (e.g., point clouds)—containing 3D positional data—of a region of the crop bed (e.g., including plants) directly below the chassis 110, captured by the first LIDAR sensor, to track a location of a target plant and the set of actuators 132 upon plant entry beneath the chassis 110, approaching of a target plant toward the set of actuators 132, execution of an action by the set of actuators 132, and plant exit from beneath the chassis 110.

Additionally or alternatively, in another implementation, the sensor module can include: a first LIDAR sensor 140 arranged below the chassis 110 and defining a first field of view extending forward toward a front of the chassis 110; and a second LIDAR sensor 140 arranged below the chassis 110 adjacent the first LIDAR sensor 140 and defining a second field of view extending opposite the first field of view and toward a rear of the chassis 110.

6.4 Scaling: One LIDAR Sensor 140+Multiple Crop Rows

In one implementation, the sensor module can include a LIDAR sensor 140—integrated within the chassis 110 and/or coupled to the rail 120—defining a field of view intersecting the crop bed and spanning a set of crops rows (e.g., one crop row, two crop rows, six crop rows) within the agricultural field.

In particular, a single LIDAR sensor 140—installed on the vehicle, such as coupled to the rail 120 and/or directly to the chassis 110 of the vehicle—can capture images (e.g., 3D optical images) of the crop bed wherein each image depicts multiple crop rows of the agricultural field. Therefore, the controller 150 can leverage images captured by this single LIDAR sensor 140 to detect plant matter—including crop plants, weeds, etc.—present in each crop row, in the set of crop rows, depicted in these images of the crop bed.

For example, the controller 150 can: receive an image—depicting a region of the crop bed spanning a first set of crop rows—captured by a LIDAR sensor 140 integrated into a chassis 110 of the vehicle (e.g., directly mounted to the chassis 110 and/or coupled to the rail 120 mounted to the chassis 110) and defining a field of view intersecting the crop bed of the agricultural field; detect a first crop plant present at a first location in a first crop row in the set of crop rows based on a first set of features extracted from the image; and detect a second crop plant present at a second location in a second crop row in the set of crop rows based on a second set of features extracted from the image. The controller 150 can therefore leverage a single image—captured by this single LIDAR sensor 140—to detect presence of multiple crop plants across the set of crop rows.

In particular, in one example, the LIDAR sensor 140 can define a field of view intersecting the crop bed and spanning a set of four crop rows. In this example, the controller 150 can leverage images captured by this single LIDAR sensor 140 to: detect crop plants, weeds, and/or any other matter present in the crop bed based on features extracted from these images captured by the LIDAR sensor; and thus selectively trigger actuation of corresponding actuator pairs 130—aligned to the set of four crops rows—accordingly.

6.5 Scaling: Multiple LIDAR Sensors+Array of Crop Rows

Additionally or alternatively, in one implementation, the sensor module can include multiple LIDAR sensors 140—integrated within the chassis 110 and/or coupled to the rail 120—each defining a field of view intersecting the crop bed and spanning a set of crop rows (e.g., one crop row, two crop rows, four crop rows, ten crop rows) within the agricultural field.

In this implementation, the controller 150 can leverage images captured by a suite of LIDAR sensors 140—installed across the vehicle, such as coupled to the rail 120 and/or directly to the chassis 110 of the vehicle (e.g., arranged approximately parallel the rail 120)—to simultaneously detect plant matter in the crop bed across an array of crop rows (e.g., four crop rows, eight crop rows, twenty crop rows, 50 crop rows) based on features extracted from these images (e.g., 3D optical images).

For example, the controller 150 can: at a first time, receive a first image—captured at approximately the first time and depicting a first region of the crop bed spanning a first set of crop rows in the agricultural field—captured by a first LIDAR sensor 140 integrated into the vehicle and defining a first field of view intersecting the crop bed of the agricultural field and spanning the first set of crop rows; and, at approximately the first time, receive a second image—captured at approximately the first time and depicting a second region of the crop bed spanning a second set of crop rows contiguous the first set of crops rows in the agricultural field—captured by a second LIDAR sensor 140 integrated into the vehicle and defining a second field of view intersecting the crop bed of the agricultural field and spanning the second set of crop rows. The controller 150 can then: detect a first set of crop plants—such as including one or more crop plants—present at a first set of locations across the first set of crop rows based on a first set of features extracted from the first image; and detect a second set of crop plants—such as including one or more crop plants—present at a second set of locations across the second set of crop rows based on a second set of features extracted from the second image. The controller 150 can therefore leverage the first and second images—captured approximately concurrently by the first and second LIDAR sensors 140—to detect presence of an array of crop plants across both the first and second set of crop rows, thereby enabling (approximately) simultaneous detection of crop plants (and/or other plant matter) across a greater region of the agricultural field.

In particular, in one example, the system 100 can include: a first LIDAR sensor 140 defining a first field of view intersecting the crop bed and spanning a first set of four crop rows; a second LIDAR sensor 140 defining a second field of view intersecting the crop bed and spanning a second set of four crop rows adjacent and/or contiguous the first set of four crops rows; and a third LIDAR sensor 140 defining a third field of view intersecting the crop bed and spanning a third set of four crop rows adjacent and/or contiguous the second set of four crops rows opposite the first set of four crop rows, such that the first, second, and third LIDAR sensors 140 cooperate to define a total field of view spanning a set of twelve crop rows in the agricultural field. In this example, the controller 150 can leverage images captured by this set of three LIDAR sensors 140—including the first, second, and third LIDAR sensor 140—to: detect crop plants, weeds, and/or any other matter present in each of the crop rows, in the set of twelve crop rows, based on features extracted from these images; and thus selectively trigger actuation of corresponding actuator pairs 130—transiently installed on the rail 120 and aligned to the set of twelve crops rows—accordingly.

6.6 Variation: LIDAR Sensor+Camera

In one variation, the sensor module can include: a LIDAR sensor 140 coupled to the chassis 110 and configured to capture 3D positional data representing a profile of the crop bed; and a camera (e.g., a color camera, a multispectral camera, a monochromatic camera) coupled to the chassis 110 and configured to capture images of the crop bed. For example, the sensor module can include one or more color cameras coupled to the chassis 110 and configured to capture color images of the crop bed. In this variation, the LIDAR sensor 140 and the camera can cooperate to capture optical images (e.g., point clouds, color images) depicting the crop bed—including crop plants, soil, weeds, etc.—during plant entry, execution of an action by the set of actuators 132 on the target plant, and plant exit.

In one implementation, the sensor module can include: a LIDAR sensor 140 arranged above the chassis 110—such as mounted to an upper surface of the chassis 110—defining a field of view (e.g., fixed or dynamic) extending outward from the chassis 110; and a camera arranged below the chassis 110 and defining a field of view facing the set of actuators 132. In another implementation, the sensor module can include: a LIDAR sensor 140 arranged below the chassis 110—such as mounted to a lower surface of the chassis 110 proximal a front of the chassis 110—defining a field of view extending toward and/or outward from the front of the chassis 110; and a camera arranged below the chassis 110 and defining a field of view facing the set of actuators 132.

7. Plant Classification

Generally, the system 100 can predict a type of plant—and/or a type of any other object (e.g., a foreign object)—present in the crop bed based on differences in various features (e.g., geometries, reflectivity, intensity) of these plants and/or objects depicted in a crop map derived from geospatial data captured by the set of sensors.

In one implementation, the system 100 can detect and distinguish crop plants (e.g., broccoli, lettuce, cauliflower) from weeds present in the crop bed depicted in 3D crop maps—derived from geospatial data (e.g., a point cloud) captured by the set of LIDAR sensors 140—based on predicted and/or nominal differences in sizes (e.g., height, width) between crop plants and weeds. In particular, in this implementation, the controller 150 can: detect and classify plants exhibiting a particular geometry (e.g., height, width), a particular reflectivity, a particular intensity, and/or located in a particular location—such as further than a threshold distance from a predicted plant location—as weeds; and trigger the set of actuators 132 to selectively weed plants classified as weeds.

Similarly, in another implementation, the system 100 can detect and distinguish crop plants from all other objects present in the crop bed—such as soil, rocks, weeds, etc.—based on a target plant size defined for crop plants (e.g., in a particular field or crop). In particular, in this implementation, the controller 150 can: detect and classify plants exhibiting a set of features corresponding to a set of target crop plant features—such as defining a target geometry (e.g., particular height, posture, width), a target reflectivity, a target intensity, etc.—and/or located within a threshold distance of a predicted plant location as a crop plant; and trigger the set of actuators 132 to selectively apply water and/or a particular plant treatment (e.g., pesticide, fungicide, herbicide) to crop plants.

In another implementation, the system 100 can detect and distinguish between different types of crop plants (e.g., soybeans, lettuce, corn)—such as a "healthy" crop plant, an "unhealthy" crop plant, a "dehydrated" crop plant, a "diseased" crop plant", a "dead" crop plant, etc.—present in the crop bed and depicted in 3D crop maps (e.g., a point cloud)—based on predicted and/or nominal differences in features between crop plants of various crop plant types. In particular, in this implementation, the controller 150 can: detect and classify crop plants exhibiting a set of features corresponding to a set of target crop plant features—such as defining a particular geometry (e.g., height, posture, width), a particular intensity, a particular reflectivity, etc.—as "healthy" crop plants; detect and classify crop plants exhibiting features deviating from the target crop plant features as "unhealthy" crop plants; and trigger the set of actuators 132 to selectively cull crop plants classified as "unhealthy" crop plants.

7.1 Plant Model

In one variation, the system 100 can train a plant model to detect plants in a crop bed and predict a plant type of a particular plant depicted in a crop map based on LIDAR images of the crop bed and predicted features of the particular plant.

In one implementation, to derive the plant model, the controller 150—and/or a remote computer system—can: access a feed of color images captured during a first time period by a color camera installed below the chassis 110 and defining a field of view facing the crop bed (e.g., directly below the chassis 110 and/or ahead of the chassis 110) and/or intersecting the set of actuators 132; label objects depicted in color images, in the feed of color images, as crop plants, weeds, soil, "unhealthy" crop plants, "healthy" crop plants, etc. to generate labeled, two-dimensional color images depicting crop plants, weeds, soil, etc. within the field; access a feed of LIDAR images—such as representing a set of LIDAR data including 3D positional data, intensity data, reflectivity data, etc.—captured by a LIDAR sensor 140 installed on the chassis 110 during the first time period (e.g., concurrent capturing of the feed of color images); fuse the two-dimensional color images with the LIDAR images to label regions of each LIDAR image, in the feed of LIDAR images, as crop plants, weeds, soil, "unhealthy" crop plants, "healthy" crop plants, etc., accordingly; and thus link characteristics (e.g., elevation, reflectivity, intensity) of these regions of the LIDAR image to presence of crop plants, weeds, soil, etc. The controller 150 and/or remote computer system can then: leverage these labeled LIDAR images to derive correlations between characteristics of the crop bed profile—represented in LIDAR images—and presence of crop plants, weeds, soil, etc. within and/or at specific locations within the crop bed; and store these correlations in a plant model. In particular, the controller 150 and/or the remote computer system can implement linear regression, machine learning, artificial intelligence, a convolutional neural network, or other analysis techniques to derive correlations between LIDAR data—including position, elevation, reflectivity, and/or intensity data—and presence of different types of plants (e.g., crop plants, weeds) represented in LIDAR images and therefore locations of these different types of plants within the crop bed.

Additionally or alternatively, in another implementation, an operator (e.g., a human operator) may manually annotate LIDAR images with crop plants, weeds, soil, etc. to generate a feed of labeled LIDAR images, and the controller 150 and/or remote computer system can then similarly ingest these labeled LIDAR images to: derive correlations between characteristics of LIDAR images—representing regions of the crop bed—and presence of crop plants, weeds, soil, etc. within the crop bed; and store these correlations in a plant model configured to detect plants depicted in LIDAR images and/or in a crop map derived from LIDAR images.

For example, the controller 150 can derive a plant model configured to detect a crop plant within the crop bed based on features extracted from an optical image (e.g., a cloud point) captured by a LIDAR sensor, such as based on: an elevation within a region of an optical image depicting the crop plant; an elevation within a region surrounding the crop plant; intensity and/or reflectivity data captured by the LIDAR sensor 140 within the region of the optical image; a distance between the crop plant and a preceding and/or succeeding crop plant in the same crop row; a distance between the crop plant and an adjacent crop plant in a next crop row; etc. In particular, in this example, the controller 150 can leverage the plant model to distinguish the crop plant from a weed proximal the crop plants—represented in a LIDAR image captured by the LIDAR sensor 140—based on predicted differences in elevation, intensity, and/or reflectivity of the crop plant and the weed. The controller 150 can therefore leverage LIDAR images—captured by one or more LIDAR sensors 140 installed on the vehicle—and the derived plant model to both identify and locate different types of plants (e.g., crop plants, weeds) within the crop bed.

8. Deployment

In one implementation, an operator (e.g., a farmer) affiliated with a particular crop may: navigate the vehicle (e.g., the mobile chassis 110) to a starting position within a field, such as along an edge of the field; align the vehicle with a set of target crop rows (e.g., 2 rows, 3 rows, 5 rows, 10 rows), such that each tire or wheel defines a pathway approximately parallel and interposed between rows of the crop and/or such that the chassis 110 seats above the set of target crop rows during movement of the vehicle across the field; adjust a position of each actuator pair 130 on the rail 120 to align the actuator pair 130 with a particular crop row in the set of target crop rows, such as by spacing each actuator pair 130 on the rail 120 by a distance approximating a pitch distance between adjacent crop rows in the field. The system 100 can then store a position of each actuator pair 130 on the rail 120, such as by automatically detecting a set of positions of the set of actuator pairs 130 and/or by prompting the operator to manually input the set of positions. The system 100 can then trigger execution of a particular treatment cycle (e.g., a weeding cycle, a watering cycle, a pesticide- or fungicide-spraying cycle) for the set of target crop rows.

Generally, the method S100 is described below as executed by the system 100 and/or controller 150 to autonomously weed an agricultural field (e.g., cull weeds within the agricultural field). However, the method S100 can be executed by the system 100 and/or controller 150 to autonomously execute any other target action on various plant matter detected in the agricultural field, such as including weeding, spraying fertilizer, spraying pesticide, etc.

8.1 Set-Up Period

Generally, the system 100—such as via the controller 150—can receive confirmation of installation of a set of actuator pairs 130 on the rail 120 during an initial setup period.

For example, the system 100 can receive confirmation of: a quantity of actuator pairs 130 installed on the rail 120; a type of end effector 134 (e.g., a weeding tool 134, a sprayer) corresponding to the set of actuator pairs 130 installed on the rail 120; a position of each actuator pair 130, in the set of actuator pairs 130, installed on the rail 120; etc. The system 100 and/or controller 150 can then leverage this information to selectively trigger actuation of the set of actuator pairs 130 to execute target actions (e.g., culling weeds, fertilizing crop plants, thinning crops) on plant matter when deployed in the agricultural field.

In one implementation, the controller 150 can: receive confirmation of installation of a particular actuator pair 130 at a particular position on the rail 120; calculate a distance between the particular actuator pair 130—and/or a set of end effectors 134 (e.g., a weeding tool 134) of the particular actuator pair 130—and a LIDAR sensor 140 integrated within the vehicle, such as coupled to the rail 120 and/or the chassis 110 of the vehicle; and store this distance in an operation profile generated for a subsequent treatment cycle for the agricultural field. During execution of the subsequent treatment cycle, the controller 150 can then leverage this distance—stored in the operation profile—to estimate distances between detected plant matter in the agricultural field and the particular actuator pair 130.

For example, during a setup period preceding an operating period, the controller 150 can: receive confirmation of installation of a first actuator pair 130—including a first actuator 132 and a second actuator 132—installed on the rail 120 at a first position; receive confirmation of the first actuator 132—including a first weeding tool 134—installed in a front position at the first position on the rail 120; and receive confirmation of the second actuator 132—including a second weeding tool 134—installed in a rear position at the first position on the rail 120. The controller 150 can then: calculate a first distance between a LIDAR sensor 140—integrated within the vehicle—and the first weeding tool 134 based on installation of the first weeding tool 134 in the front position at the first position on the rail 120; calculate a second distance between the LIDAR sensor 140 and the second weeding tool 134 based on installation of the second weeding tool 134 in the rear position at the first position on the rail 120; and store the first and second distances—linked to the first weeding tool 134 and the second weeding tool 134, respectively—in an operation profile generated for the operating period.

Additionally, in the preceding example, the controller 150 can: receive confirmation of installation of a second actuator pair 130—including a third actuator 132 and a fourth actuator 132—installed on the rail 120 at a second position offset the first position; receive confirmation of the third actuator 132—including a third weeding tool 134—installed in the front position at the second position on the rail 120; receive confirmation of the fourth actuator 132—including a fourth weeding tool 134—installed in a rear position at the second position on the rail 120; calculate a third distance between the LIDAR sensor 140 and the third weeding tool 134 based on installation of the third weeding tool 134 in the front position at the second position on the rail 120; calculate a fourth distance between the LIDAR sensor 140 and the fourth weeding tool 134 based on installation of the fourth weeding tool 134 in the rear position at the second position on the rail 120; and store the third and fourth distances—linked to the third weeding tool 134 and the fourth weeding tool 134, respectively—in the operation profile.

The controller 150 can thus repeat this process for each actuator pair 130, in the set of actuator pairs 130, installed on the rail 120 during the setup period. The controller 150 can then access this operation profile during the operating period to: estimate distances between detected plant matter in the agricultural field and corresponding actuator pairs 130, in the set of actuator pairs 130, on the rail 120; and selectively trigger actuation of weeding tools 134 of the set of actuator pairs 130 accordingly.

In one variation, the system 100 can interface with an operator portal executing on a computing device (e.g., a tablet, a smartphone)—such as executing within a native application or webapp—to receive setup information from the operator during the setup period. In particular, in this variation, during the setup period, the operator may access the operator portal to input various setup information—such as including a quantity of actuator pairs 130 installed on the rail 120, a type of end effector 134 (e.g., a weeding tool 134, a sprayer) corresponding to the set of actuator pairs 130 installed on the rail 120, a position of each actuator pair 130, in the set of actuator pairs 130, installed on the rail 120, etc.—for a subsequent operating period. The system 100 and/or controller 150 can then receive this information from the operator via the operator portal and store this setup information in an operation profile—generated for the subsequent operating period—accordingly.

8.2 Image Collection

Block S110 of the method S100 recites: at an initial time, receiving a first image captured by a LIDAR sensor 140—integrated into a chassis 110 of the vehicle—defining a field of view intersecting a crop bed of the agricultural field, the first image captured by the LIDAR sensor 140 at approximately the initial time and depicting a first region of the crop bed spanning a first set of crop rows.

In particular, in one implementation, at the initial time, the controller 150 can receive a first image—captured by a first LIDAR sensor 140 integrated within the vehicle and defining a field of view intersecting the crop bed and excluding the rail 120 and/or the set of actuator pairs 130—and depicting a first region of the crop bed spanning a first set of crops rows, falling within the field of view of the first LIDAR sensor, and arranged ahead of the set of actuator pairs 130 (e.g., within the first set of crop rows) at the initial time. For example, the system 100 can include a first actuator pair 130 installed at a first position on the rail 120 and including: a first actuator 132 installed in a front position on the rail 120 and including a first weeding tool 134 (i.e., end effector 134) extending toward the crop bed from the rail 120; and a second actuator 132 installed in a rear position on the rail 120 and including a second weeding tool 134 (i.e., end effector 134) extending toward the crop bed from the rail 120. In this example, at the initial time, the controller 150 can: receive a first image—captured by a first LIDAR sensor 140 integrated within the vehicle and defining a field of view intersecting the crop bed and excluding the first weeding tool 134 and the second weeding tool 134—depicting a first region of the crop bed spanning a first set of crops rows, falling within the field of view of the first LIDAR sensor, and arranged ahead of (e.g., longitudinally in front of) the first and second weeding tools 134 at the initial time, such that as the vehicle continues traversing the first set of crop rows, the first and second weeding tool 134 intersect the first region of the crop bed at a first time immediately succeeding the initial time.

Generally, the controller 150 can access a feed of images captured by one or more LIDAR sensors 140 installed on the chassis 110, such as at a fixed and/or dynamic frequency (e.g., continuous, semi-continuous, at fixed intervals). For example, the controller 150 can trigger a first LIDAR sensor 140—integrated within the chassis 110, such as directly coupled to the chassis 110 and/or to the rail 120—to capture a feed of images (e.g., 3D optical images) at a target capture rate. The controller 150 can then: access this feed of images in (near) real-time; interpret locations of crop plants and/or weeds in the crop bed based on features extracted from the feed of images in (near) real-time; and selectively actuate the set of actuator pairs 130—in (near) real-time—to execute a target action (e.g., weeding, spraying, thinning crops) on crop plants and/or weeds depicted in the feed of images accordingly.

In one variation, the controller 150 can compile a set of images—extracted from the feed of images captured by one or more LIDAR sensors 140—to generate a map of the crop bed. The controller 150 can then leverage this map—such as in combination with images captured by a set of optical sensors (e.g., a camera) of lower resolution than the one or more LIDAR sensors 140—to detect objects (e.g., plant matter) in the crop bed. For example, the controller 150 can: access a first image captured by a first LIDAR sensor 140 at a first time and depicting a first subregion of the crop bed; access a second image captured by the first LIDAR sensor 140 at a second time—succeeding the first time—and depicting a second subregion of the crop bed adjacent and/or overlapping the first subregion; and leverage the first and second image to generate a map of a region of the crop bed encompassing both the first and second subregions. Additionally and/or alternatively, in this example, the controller 150 can: access a third image captured by a second LIDAR sensor 140 at approximately the first time and depicting a third subregion of the crop bed; and leverage the third image—in combination with the first and second images captured by the first LIDAR sensor 140—to generate and/or update the map of the region encompassing the first, second, and third subregions.

8.3 Plant Detection

Block S120 of the method S100 recites: detecting presence of a first crop plant at a first location within a first crop row, in the set of crop rows, based on features extracted from the first image, the first location intersecting a longitudinal axis extending along the first crop row and a first lateral axis perpendicular the longitudinal axis.

Generally, the controller 150 can detect plant matter—such as including crop plants, weeds, etc.—present in the crop bed based on features extracted from the feed of images captured by the set of LIDAR sensors 140 integrated into the vehicle.

In particular, the controller 150 can detect a crop plant—or any other type of plant matter—at a particular location within a crop row of the crop bed depicted in an image captured by the LIDAR sensor. For example, the controller 150 can: access an image of the crop bed captured by the LIDAR sensor; detect presence of a first crop plant within a first crop row, in a set of crop rows depicted in the image, based on features extracted from the image; and interpret a location—intersecting a longitudinal axis extending along (e.g., approximately parallel) the first crop row and a lateral axis approximately perpendicular the longitudinal axis—of the first crop plant within the first crop row based on these features. The controller 150 can therefore derive a set of coordinates—corresponding to intersection of the longitudinal and lateral axis—representing the location of the first crop plant within the first crop row.

In the preceding example, to detect the first crop plant within the first crop row, the controller 150 can: detect a cluster of pixels depicted in the image (e.g., a 3D depth image) captured by the LIDAR sensor; and map this cluster of pixels to plant matter of a crop plant type, such as based on a plant model implemented by the controller 150.

In one implementation, the controller 150 can: access a first optical image—such as a 3D representation of a region of the crop bed in front of the set of actuators 132 and/or in front of the chassis 110—captured by a LIDAR sensor 140 coupled to the chassis 110 (e.g., above or below the chassis 110) at a first time; extract a set features from the first optical image; and identify crop plants, weeds, soil, etc. in the region of the crop bed based on the set of features and the plant model linking features extracted from optical images (e.g., LIDAR images) of the crop bed to presence of plants and other matter (e.g., weeds, soil) within the crop bed, as described above. For example, the controller 150 can implement template matching, object recognition, and/or other techniques to detect plants in the first optical image and to distinguish a first crop plant from a first weed—present in the region of the crop bed—based on features of the first optical image.

8.3.1 Estimating Distance: Crop Plant to Weeding Tool

Block S130 of the method S100 recites: estimating a first distance from the first crop plant to a first weeding tool 134, in a set of weeding tools 134, flexibly coupled to a rail 120 coupled to the chassis 110 proximal a rear of the vehicle, the first weeding tool 134 arranged at a first position on the rail 120 aligned to the first crop row. Block S130 of the method S100 further recites: estimating a second distance from the first crop plant to a second weeding tool 134, in the set of weeding tools 134, flexibly coupled to the rail 120 at the first position behind the first weeding tool 134.

Generally, the controller 150 can estimate a distance between a detected crop plant (or any other plant matter detected in the crop bed) and an actuator 132 and/or end effector 134 (e.g., weeding tool 134) of the actuator 132.

In one implementation, the controller 150 can leverage a known position of an actuator 132 on the rail 120—such as defined during a setup period (e.g., as described above)—to estimate the distance between the actuator 132 and the end effector 134. In particular, in this implementation, the controller 150 can: receive an image—depicting a crop row of a crop bed—captured by the LIDAR sensor; detect a crop plant present at a first location within the crop row; estimate a distance between the crop plant and the LIDAR sensor 140 based on features extracted from the image; access a position of a first actuator 132—installed on the rail 120 aligned to the crop row—on the rail 120; estimate a second distance between the LIDAR sensor 140 and the first actuator 132; and, based on the first distance and the second distance, estimate a third distance between the crop plant and the first actuator 132.

For example, during a setup period, the controller 150 can: receive confirmation of installation of a first actuator pair 130—including a first weeding tool 134 installed in a front position and a second weeding tool 134 in a rear position—at a first position on the rail 120; calculate a first distance between the LIDAR sensor 140 and the first weeding tool 134 based on installation of the first weeding tool 134 in the front position at the first position on the rail 120; and calculate a second distance between the LIDAR sensor 140 and the second weeding tool 134 based on installation of the second weeding tool 134 in the rear position at the first position on the rail 120. Then, during an operating period succeeding the setup period, the controller 150 can: receive a first image captured by the LIDAR sensor 140 at a first time, during the setup period, and depicting a first region of a crop bed spanning a set of crop rows; detect presence of a first crop plant at a first location within a first crop row, in the set of crop rows, based on features extracted from the first image; estimate a third distance between the first crop plant and the LIDAR sensor 140 based on features extracted from the first image; predict a fourth distance from the first crop plant to the first weeding tool 134—at the first time-based on the first distance and the third distance; and predict a fifth distance from the first crop plant to the second weeding tool 134—at the first time-based on the second distance and the third distance.

8.4 Derive Elevation Profile

Block S122 of the method S100 recites: deriving a first elevation profile for the first region of the crop bed based on features extracted from the first image.

In particular, in one implementation, the controller 150 can: receive an image—such as a 3D depth image—captured by a LIDAR sensor 140 integrated within the vehicle and defining a field of view intersecting the crop bed—depicting a region of the crop bed spanning a set of crops rows falling within the field of view of the LIDAR sensor; and, based on 3D elevation data extracted from the image, derive an elevation profile representing changes in elevation across the region of the crop bed—spanning the set of crop rows—depicted in the image.

The controller 150 can then leverage this elevation profile to derive a sequence of tool heights for a particular actuator 132 across a region of the crop bed. In particular, the controller 150 can be configured to maintain each end-effector 134 (e.g., a weeding tool 134) of each actuator 132 at a fixed height—such as within a threshold distance of a surface of the crop bed—relative the crop bed, thereby minimizing soil disruption while enabling cutting of weeds present in the topsoil. The controller 150 can therefore: extract a set of elevation data, from the elevation profile, corresponding to a crop row aligned to the particular actuator 132; access a target height—relative the surface of the crop bed—defined for the set of actuators 132 coupled to the rail 120; and, based on this set of elevation data and the target height, derive the sequence of tool heights for this particular actuator 132. The controller 150 can repeat this process for each other actuator 132, in the set of actuators 132, in (near) real-time to maintain each actuator 132, in the set of actuators 132, at the fixed height relative the crop bed, regardless of variations in elevation within and/or across crop rows of the crop bed.

8.5 Executing the Target Action

Upon detection of a plant (e.g., a crop plant, a weed) in the region of the crop bed approaching (e.g., ahead of) the set of actuators 132, the controller 150 can selectively trigger the set of actuators 132 to execute an action on the target plant.

In one implementation, the controller 150 can leverage high-resolution odometry information—such as captured by a set of geospatial sensors and/or motion coupled to the chassis 110—in combination with optical data captured by a first LIDAR sensor 140 to predict a target time for execution of the action on the target plant by the set of actuators 132. For example, the controller 150 can: access a first optical image—captured by the first LIDAR sensor 140 at a first time—representing a first region of the crop bed; detect a first crop plant at a first location within the first region of the crop bed and at the first time based on a first set of features extracted from the first optical image; calculate a distance between the first crop plant and a first actuator 132—aligned with a crop row containing the first crop plant—at the first time based on a known distance between the first LIDAR sensor 140 and the first actuator 132 and an estimated distance between the first LIDAR sensor 140 and the first crop plant at the first location; access a speed of the vehicle and therefore a speed of the first crop plant relative to the first actuator 132, such as by implementing visual odometry techniques or by reading speed from a speedometer in the vehicle; calculate a target time for triggering execution of the target action on the first crop plant based on the distance between the first crop plant and the first actuator 132 and the speed of the vehicle, such as by dividing the distance by the speed; and trigger the first actuator 132 to execute the target action (e.g., cutting weeds, thinning crops, spraying fertilizer or pesticide) on the first crop plant at the target time.

Additionally or alternatively, in another implementation, the controller 150 can leverage optical data recorded by a second optical sensor—such as a second LIDAR sensor 140 or a camera (e.g., a color camera, a multispectral camera, a monochromatic camera)—defining a field of view extending ahead of the set of actuators 132 to track a position of a detected plant relative a first actuator 132 aligned to the detected plant. For example, the controller 150 can: access a first optical image—captured by the first LIDAR sensor 140 at a first time—representing a first region of the crop bed; and detect a first crop plant at a first location within the first region of the crop bed and at the first time based on a first set of features extracted from the first optical image. Then, over a first time period succeeding the first time, the controller 150 can: access a feed of optical images captured by the second optical sensor (e.g., a color camera, a LIDAR sensor); detect the first crop plant in images in the feed; track a distance between the first crop plant and a first actuator 132—aligned to the first crop plant—based on these images; and automatically trigger the first actuator 132 to execute an action on the first crop plant in response to the distance between the first crop plant and the first actuator 132 falling below a threshold distance.

8.6 Actuator Pathway

Block S140 of the method S100 recites: deriving a first target pathway for the first weeding tool 134 based on the first distance and the first elevation profile; and deriving a second target pathway for the second weeding tool 134 based on the second distance and the first elevation profile.

Generally, the controller 150 can selectively trigger the set of actuators 132 to execute an action on a target plant according to an actuator pathway defined for the set of actuators 132. In particular, the controller 150 can selectively trigger: a first actuator 132 of an actuator pair 130 to follow a first pathway; and a second actuator 132 of the actuator pair 130 to follow a second pathway corresponding to the first pathway, such that the first and second pathways combine to form an approximately 360-degree pathway about a target plant.

In particular, the controller 150 can: derive a first target pathway for a first actuator 132—including a first end effector 134 (e.g., a weeding tool 134) configured to execute the target action—in an actuator pair 130 transiently installed at a particular position on the rail 120; and derive a second target pathway for a second actuator 132—including a second end effector 134 (e.g., a weeding tool 134) configured to execute the target action—in the actuator pair 130. For example, the controller 150 can: derive a first actuator pathway for a first weeding tool 134—integrated in the first actuator 132, in the actuator pair 130, arranged in a front position at the particular position on the rail 120—such that the first weeding tool 134 is actuated according to (e.g., along) the first actuator pathway in order to cull weeds present in the crop bed along the first actuator pathway and avoid crop plants present in the crop bed; and derive a second actuator pathway for a second weeding tool 134—integrated in the second actuator 132, in the actuator pair 130, arranged in a rear position at the particular position on the rail 120—such that the second weeding tool 134 is actuated according to (e.g., along) the second actuator pathway in order to cull weeds present in the crop bed along the second actuator pathway and avoid crop plants present in the crop bed.

In one implementation, the controller 150 can derive an actuator pathway (or "target pathway") for a particular actuator 132—and/or a particular end effector 134 (e.g., weeding tool 134, sprayer) of the particular actuator 132—defining: a sequence of lateral tool positions relative a longitudinal axis extending along a crop row and intersecting one or more crop plants present in the crop row; a sequence of tool heights configured to maintain the particular end effector 134 at a fixed height relative a surface of the crop bed; and/or a particular actuation pattern, such as a sinusoidal actuation pattern that locates the particular end effector 134 on alternating sides of each subsequent crop plant in the crop row—such as by crossing the longitudinal axis extending along the crop row between each subsequent crop plant—and/or a fixed-side actuation pattern that locates the particular end effector 134 on a fixed side of subsequent crop plants (or of the longitudinal axis) in the crop row.

In this implementation, the controller 150 can thus: calculate a sequence of tool locations—for the particular end effector 134—based on the sequence of lateral tool positions, the sequence of tool heights, and/or the particular actuation pattern selected for the particular actuator 132; and derive the actuator pathway based on the sequence of tool locations. The controller 150 can then drive the particular actuator 132—according to this actuator pathway (or "target pathway")—to locate the end effector 134 of the particular actuator 132 in the sequence of tool locations across a particular region of the crop row.

In particular, Block S150 of the method S100 recites, driving the first weeding tool 134 across a first sequence of tool locations according to the first target pathway—selected for the first weeding tool 134—to: cut weeds behind and proximal the first crop plant; and locate the first weeding tool 134 on a first side of the first crop plant, offset the longitudinal axis, at the first lateral axis. Block S150 of the method S100 further recites driving the second weeding tool 134 across a second sequence of tool locations according to the second target pathway—selected for the second weeding tool 134—to: cut weeds behind and proximal the first crop plant; and locate the second weeding tool 134 on a second side of the first crop plant, opposite the first side and offset the longitudinal axis, at the first lateral axis.

8.6.1 Actuator Pathway Selection: Vehicle Speed

In one implementation, the controller 150 can select a particular actuator pathway for the set of actuators 132 based on a speed of the vehicle and/or the mobile chassis 110.

In particular, in this implementation, for a first actuator pair 130—including a first actuator 132 arranged in the front position and a second actuator 132 arranged in the rear position—the controller 150 can: predict intersection of a first weeding tool 134 (or any other end effector 134)—of the first actuator 132—and a first crop plant at a first time based on a speed of vehicle and a first (calculated) distance between the first weeding tool 134 and the first crop plant; predict intersection of a second weeding tool 134 (or any other end effector 134)—of the second actuator 132—and the first crop plant at a second time, succeeding the first time, based on the speed of the vehicle and a second (calculated) distance between the second weeding tool 134 and the first crop plant; select a first actuator pathway for the first actuator 132 and/or the first weeding tool 134 based on the speed and the first distance; select a second actuator pathway—such as complementary or "mirroring" the first actuator pathway—for the second actuator 132 and/or the second weeding tool 134 based on the speed and the second distance; drive the first weeding tool 134 across a first sequence of tool locations—according to the first target pathway—to locate the first weeding tool 134 on a first side of the first crop plant at the first time; and drive the second weeding tool 134 across a second sequence of tool locations—according to the second target pathway—to locate the second weeding tool 134 on the second side of the first crop plant at the second time.

For example, in response to the speed of the vehicle falling within a first range, the controller 150 can: select a first sinusoidal pathway for a first actuator 132 in a actuator pair 130; select a second sinusoidal pathway—out-of-phase from the first sinusoidal pathway (e.g., 180 degrees out of phase)—for a second actuator 132 in the actuator pair 130; and selectively trigger the first and second actuators 132 in the actuator pair 130 to execute actions on target plants according to the first and second sinusoidal pathways respectively. Then, in response to the speed of the vehicle increasing and falling within a second range exceeding the first range, the controller 150 can: select a first pathway for the first actuator 132 configured to maintain the first actuator 132 on a first side of plants within a crop row; select a second pathway for the second actuator 132 configured to maintain the second actuator 132 on a second side of plants—opposite the first side—within the crop row; and selectively trigger the first and second actuators 132 in the actuator pair 130 to execute actions on target plants according to the first and second pathways respectively.

Therefore, as the speed of the vehicle increases, the controller 150 can automatically modify an actuator pathway of the set of actuators 132 in order to consistently execute an action on the target plant and avoid non-target plants, such as by only weeding weeds and avoiding contact with crop plants in the crop bed.

8.6.2 Actuator Pathway: Spacing Between Crop Plants

Generally, the controller 150 can select a particular actuator pathway for a set of actuators 132—in an actuator pair 130—based on a pitch between adjacent crop plants in a crop row. More specifically, the controller 150 can: select a particular actuation pattern—such as a sinusoidal actuation pattern and/or a fixed-side actuation pattern—for the actuator pair 130 based on the pitch; and derive an actuator pathway—for each actuator 132 in the set of actuators 132—based on this particular actuation pattern.

In particular, in this implementation, the controller 150 can: access a first target pitch between crop plants in the agricultural field, such as defined by the operator during the setup period and/or automatically detected by the controller 150 as the vehicle traverses the agricultural field; select a first tool actuation pattern, in a set of tool actuation patterns, for the set of weeding tools 134 during the first time period based on the first target pitch; derive a first actuator pathway—such as defining the first tool actuation pattern, a first sequence of lateral tool locations (e.g., relative the longitudinal axis extending along a crop row in the agricultural field), and/or a first sequence of tool heights—for a first actuator 132 in the actuator pair 130; and derive a second actuator pathway—such as defining the first tool actuation pattern, a second sequence of lateral tool locations, and/or a second sequence of tool heights—for a second actuator 132 in the actuator pair 130.

In one example, the controller 150 can: select a first tool actuation pattern—such as a sinusoidal actuation pattern—for a set of actuator pairs 130 transiently installed on the vehicle during a first operation period in a first agricultural field defining a first target pitch between sequential crop plants in crops rows of the first agricultural field; and select a second tool actuation pattern—such as a fixed-side actuation pattern—for the set of actuator pairs 130 transiently installed on the vehicle during a second operation period in a second agricultural field defining a second target pitch between sequential crop plants in crops rows of the second agricultural field.

In particular, in the preceding example, the controller 150 can, during the first operation period in the first agricultural field: access a first target pitch between crop plants in the first agricultural field; and select a first tool actuation pattern defining a sinusoidal actuation pattern for a set of weeding tools 134 integrated in a first actuator pair 130 in the set of actuator pairs 130, during the first operation period based on the first target pitch. Then, in response to detection of a first crop plant, in a first crop row aligned to the first actuator pair 130, in the first agricultural field, the controller 150 can: derive a first actuation pathway for the first weeding tool 134 based on a first distance between the first weeding tool 134 and the first crop plant, a first elevation profile derived for a region of the crop bed including the first crop plant, and the first tool actuation pattern (e.g., the sinusoidal actuation pattern); and derive a second actuation pathway for the second weeding tool 134 based on a second distance between the second weeding tool 134 and the first crop plant, the first elevation profile, and the first tool actuation pattern.

Then, during the second operation period in the second agricultural field, the controller 150 can: access a second target pitch—less than the first target pitch—between crop plants in the second agricultural field; and select a second tool actuation pattern defining a fixed-side actuation pattern for the set of weeding tools 134—integrated in the first actuator pair 130—during the first operation period based on the second target pitch. Then, in response to detection of a second crop plant, in a second crop row aligned to the first actuator pair 130, in the second agricultural field, the controller 150 can: derive a third actuation pathway for the first weeding tool 134 based on a third distance between the first weeding tool 134 and the second crop plant, a second elevation profile derived for a region of the crop bed including the second crop plant, and the second tool actuation pattern (e.g., the fixed-side actuation pattern); and derive a fourth actuation pathway for the second weeding tool 134 based on a fourth distance between the second weeding tool 134 and the second crop plant, the second elevation profile, and the second tool actuation pattern.

Additionally or alternatively, in one implementation, the controller 150 can automatically select a replacement actuation pattern for a particular actuator pair 130 in (near) real-time, based on a detected change in pitch between adjacent crop plants in a crop row.

In particular, in this implementation, the controller 150 can: access a first pitch between a first crop plant and a second crop plant sequentially arranged in a crop row of an agricultural field, such as automatically derived by the controller 150 based on images captured by the LIDAR sensor; select a first tool actuation pattern, in a set of tool actuation patterns, for an actuator pair 130—such as including a set of weeding tools 134—traversing a region between the first and second crop plant based on the first pitch; derive a first actuator pathway—such as defining the first tool actuation pattern, a first sequence of lateral tool locations (e.g., relative the longitudinal axis extending along the crop row in the agricultural field), and/or a first sequence of tool heights—for a first actuator 132 in the actuator pair 130; and derive a second actuator pathway—such as defining the first tool actuation pattern, a second sequence of lateral tool locations, and/or a second sequence of tool heights—for a second actuator 132 in the actuator pair 130.

Then, the controller 150 can: access a second pitch between the second crop plant and a third crop plant sequentially arranged in the crop row, such as automatically derived by the controller 150 based on images captured by the LIDAR sensor; select a second tool actuation pattern—in replacement of the first tool actuation pattern—for the actuator pair 130 traversing a region between the second and third crop plant based on the second pitch; derive a third actuator pathway—such as defining the second tool actuation pattern, a third sequence of lateral tool locations (e.g., relative the longitudinal axis extending along the crop row in the agricultural field), and/or a third sequence of tool heights—for the first actuator 132; and derive a fourth actuator pathway—such as defining the second tool actuation pattern, a fourth sequence of lateral tool locations, and/or a fourth sequence of tool heights—for the second actuator 132. The controller 150 can therefore select a replacement tool actuation pattern—such as alternating between the sinusoidal actuation pattern and the fixed-side actuation pattern—based on a detected pitch between sequential crop plants in the crop row.

Additionally or alternatively, in one implementation, the controller 150 can select equivalent or different actuation patterns for different actuator pairs 130 installed on the rail 120, based on varying pitch between crop plants in different crop rows of the agricultural field.

For example, the system 100 can include: a first actuator pair 130—including a first actuator 132 including a first weeding tool 134 arranged in the front position on the rail 120 and a second actuator 132 including a second weeding tool 134 arranged in the rear position on the rail 120—transiently installed on a first position on the rail 120 aligned to a first crop row in a set of crop rows; and a second actuator pair 130—including a third actuator 132 including a third weeding tool 134 arranged in the front position on the rail 120 and a fourth actuator 132 including a fourth weeding tool 134 arranged in the rear position on the rail 120—transiently installed on a second position on the rail 120 aligned to a second crop row in the set of crop rows. In this example, the controller 150 can: access an image captured by the LIDAR sensor 140 defining a field of view intersecting a region of a crop bed spanning the first and second crop rows; detect presence of a first crop plant at a first location and a second crop plant at a second location—sequentially succeeding the first crop plant—within the first crop row based on features extracted from the image; detect presence of a third crop plant at a third location and a fourth crop plant at a fourth location—sequentially succeeding the third crop plant—within the second crop row based on features extracted from the image; estimate a first pitch (or "distance") between the first and second crop plants in the first crop row; and estimate a second pitch (or "distance") between the third and fourth crop plants in the second crop row.

Then, in response to the first pitch exceeding a threshold pitch (e.g., ten inches, twenty inches), the controller 150 can select a first actuation pattern for the first actuator pair 130 configured to cut weeds present in the first crop row. Furthermore, in response to the second pitch falling below threshold pitch, the controller 150 can select a second actuation pattern—different from the first actuation pattern—for the second actuator pair 130 configured to cut weeds present in the second crop row. In particular, in one example, the controller 150 can: select a sinusoidal actuation pattern for actuation of the first actuator pair 130 between the first and second crop plants; and select a fixed-side actuation pattern for actuation of the second actuator pair 130 between the third and fourth crop plants, thereby reducing risk of cutting the fourth crop plant.

8.6.3 Actuator Pathway: Elevation Profile

In one implementation, the controller 150 can derive a particular actuator pathway for an actuator pair 130, in the set of actuator pairs 130, based on an elevation profile derived for a region of the crop bed and/or crop row aligned to the actuator pair 130.

In particular, in this implementation, the controller 150 can: receive an image (e.g., a 3D depth image)—captured by a LIDAR sensor 140 integrated within the vehicle and defining a field of view intersecting the crop bed—depicting a region of the crop bed spanning a set of crops rows falling within the field of view of the LIDAR sensor; and, based on 3D elevation data extracted from the image, derive an elevation profile for the region of the crop bed depicted in the image. The controller 150 can then: extract a subset of elevation data corresponding to a first crop row, in the set of crop rows, aligned to a first actuator pair 130 transiently installed on the rail 120; and, based on this subset of elevation data and a target height defined for the first actuator pair 130—such as relative a surface of the crop bed—derive a sequence of tool heights for a set of end effectors 134 of the first actuator pair 130 configured to maintain the set of end effectors 134 at the target height relative the surface of the tool bed. The controller 150 can then derive a particular actuator pathway—for each actuator 132 in the first actuator pair 130—based on this sequence of tool heights.

For example, the first actuator pair 130 can include: a first actuator 132 including a first weeding tool 134, in a set of weeding tools 134, arranged in a front position on the rail 120; and a second actuator 132 including a second weeding tool 134, in the set of weeding tools 134, arranged in a rear position—opposite the front position—on the rail 120. In this example, the controller 150 can: receive an image captured by the LIDAR sensor; based on 3D elevation data extracted from the image, derive an elevation profile for a region of the crop bed depicted in the image; access a target height defined for the set of weeding tools 134 relative the crop bed, such as within a threshold height (e.g., one centimeter, five centimeters) of a surface of the crop bed; calculate a first sequence of tool heights for the first weeding tool 134 based on the target height and the elevation profile, such as including a first subset of elevation data corresponding to a first pathway traversed by the first weeding tool 134; and calculate a second sequence of tool heights for the second weeding tool 134 based on the target height and the elevation profile, such as including a second subset of elevation data corresponding to a second pathway traversed by the second weeding tool 134.

The controller 150 can then: drive the first weeding tool 134 across the first sequence of tool heights concurrent actuation of the first weeding tool 134 across a first sequence of lateral tool locations (e.g., relative the longitudinal axis extending along the crop row)—and therefore according to a first actuation pathway—to finally locate the first weeding tool 134 on a first side of a crop plant in the crop row and at the target height; and drive the second weeding tool 134 across the second sequence of tool heights concurrent actuation of the second weeding tool 134 across a second sequence of lateral tool locations (e.g., relative the longitudinal axis extending along the crop row)—and therefore according to a second actuation pathway—to finally locate the second weeding tool 134 on a second side of the crop plant, opposite the first side, and at the target height, such that the first and second weeding tools 134 cooperate to remove weeds preceding the crop plant in the crop row, on either side of the crop plant, and succeeding the crop plant in the crop row.

8.6.4 Actuator Pathway: End Effector Geometry

In one variation, the controller 150 can derive a particular actuator pathway for an actuator pair 130, in the set of actuator pairs 130, based on a geometry (e.g., a length, a width, a shape, a profile) of an end effector 134 of the actuator pair 130. In particular, in this variation, each actuator 132 can be configured to transiently receive and couple to different end effectors 134 over time, such as including end effectors 134 of varying geometries and/or configured to execute varying target actions (e.g., cutting weeds, spraying crop plants, thinning crops).

For example, the system 100 can include a first actuator 132: transiently installed on the rail 120 at a first position aligned to a first crop row; and including a first weeding tool 134—defining a first geometry—coupled to the first actuator 132 during a first time period. During the first time period, the controller 150 can: select a first actuator pathway or pattern corresponding to the first geometry; and selectively trigger actuation of the first weeding tool 134—via the first actuator 132—according to the first actuator pathway configured to promote cutting of weeds within the first crop row and avoid contact of the first weeding tool 134 with crop plants in the first crop row during the first time period. Then, during a second time period, the first actuator 132 can include a second weeding tool 134—coupled to the first actuator 132 in replacement of the first weeding tool 134 during the second time period—defining a second geometry differing from the first geometry of the first weeding tool 134. Then, during the second time period, the controller 150 can: select a second actuator pathway or pattern—in replacement of the first actuator pathway—corresponding to the second geometry; and selectively trigger actuation of the second weeding tool 134—via the first actuator 132—according to the second actuator pathway configured to promote cutting of weeds within the first crop row and avoid contact of the first weeding tool 134 with crop plants in the first crop row during the second time period.

In particular, in one example, the first weeding tool 134 can define a first size and the second weeding tool 134 can define a second size exceeding the first size. The controller 150 can: based on the first size, select a sinusoidal actuation pattern for actuation of the first weeding tool 134 during the first time period via the first actuator 132; and, based on the second size, select a fixed-side actuation pattern for actuation of the second weeding tool 134 during the second time period—via the first actuator 132—in order to avoid contact between the second weeding tool 134 and crop plants in the first crop row.

8.7 Deployment: Multiple Crop Rows+1 Lidar Sensor

In one implementation, the system 100 and/or controller 150 can execute the methods described above to: receive an image, in a feed of images, from a LIDAR sensor 140 integrated within the mobile chassis 110—such as mounted to the rail 120 and/or directly mounted to the chassis 110—defining a field of view spanning a set of crop rows (e.g., two crop rows, four crop rows, ten crop rows); (approximately) simultaneously detect crop plants and/or other plant matter (e.g., weeds) at locations across the set of crop rows based on features extracted from this single image and/or single feed of images captured by the LIDAR sensor 140; and selectively trigger actuation of a set of actuator pairs 130—each actuator pair 130, in the set of actuator pairs 130, aligned to a particular crop row in the set of crop rows—according to actuator pathways defined for each actuator pair 130, in the set of actuator pairs 130, to selectively execute a target action (e.g., weeding, spraying fertilizer, spraying pesticide, thinning crops) on crop plants and/or other plant matter in each crop row in the set of crop rows.

For example, the system 100 can include: a first actuator pair 130 installed at a first position on the rail 120 aligned to a first crop row in a set of crop rows—falling within a field of view of the LIDAR sensor 140—in the agricultural field; a second actuator pair 130 installed at a second position on the rail 120 aligned to a second crop row in the set of crop rows; and a third actuator pair 130 installed at a third position on the rail 120 aligned to a third crop row in the set of crop rows. The first actuator pair 130 can include: a first actuator 132—including a first weeding tool 134—arranged in a front position at the first position on the rail 120; and a second actuator 132—including a second weeding tool 134—arranged in a rear position at the first position on the rail 120. The second actuator pair 130 can include: a third actuator 132—including a third weeding tool 134—arranged in the front position at the second position on the rail 120; and a fourth actuator 132—including a fourth weeding tool 134—arranged in the rear position at the second position on the rail 120. Finally, the third actuator pair 130 can include: a fifth actuator 132—including a fifth weeding tool 134—arranged in the front position at the third position on the rail 120; and a sixth actuator 132—including a sixth weeding tool 134—arranged in the rear position at the third position on the rail 120.

In this example, during operation, the controller 150 can: receive an image captured by the LIDAR sensor 140 and depicting a region of the crop bed spanning the set of crop rows; derive an elevation profile for the region of the crop bed based on features extracted from the image; detect presence of a first crop plant at a first location—intersecting a first longitudinal axis extending along the first crop row and a first lateral axis (approximately) perpendicular the first longitudinal axis within the first crop row—based on features extracted from the image; detect presence of a second crop plant at a second location—intersecting a second longitudinal axis extending along the second crop row and a second lateral axis (approximately) perpendicular the second longitudinal axis within the first crop row—based on features extracted from the image; and detect presence of a third crop plant at a third location—intersecting a third longitudinal axis extending along the third crop row and a third lateral axis (approximately) perpendicular the third longitudinal axis within the third crop row—based on features extracted from the image.

Then, in the preceding example, the controller 150 can: estimate a first distance from the first crop plant to the first weeding tool 134 and estimate a second distance from the first crop plant—in the first crop row—to the second weeding tool 134; estimate a third distance from the second crop plant—in the second crop row—to the third weeding tool 134 and estimate a fourth distance from the second crop plant to the fourth weeding tool 134; and estimate a fifth distance from the third crop plant—in the third crop row—to the fifth weeding tool 134 and estimate a sixth distance from the third crop plant to the sixth weeding tool 134. The controller 150 can then: derive a first target pathway for the first weeding tool 134—arranged in the front position on the rail 120 and aligned to the first crop row—based on the first distance and the elevation profile; derive a second target pathway for the second weeding tool 134—arranged in the rear position on the rail 120 and aligned to the first crop row—based on the second distance and the first elevation profile; derive a third target pathway for the third weeding tool 134—arranged in the front position on the rail 120 and aligned to the second crop row—based on the third distance and the elevation profile; derive a fourth target pathway for the fourth weeding tool 134—arranged in the rear position on the rail 120 and aligned to the second crop row—based on the fourth distance and the elevation profile; derive a fifth target pathway for the fifth weeding tool—arranged in the front position on the rail 120 and aligned to the third crop row—134 based on the fifth distance and the elevation profile; and derive a sixth target pathway for the sixth weeding tool 134—arranged in the rear position on the rail 120 and aligned to the third crop row—based on the sixth distance and the elevation profile.

The controller 150 can therefore: (approximately) simultaneously detect crop plants—and/or other plant matter—across the set of crop rows based on the image captured by the LIDAR sensor 140; derive target pathways for each weeding tool 134—of the set of actuator pairs 130—based on detection of these crop plants and elevation of the crop bed within each crop row; and trigger actuation of the set of weeding tools 134 accordingly in (near) real-time to cut weeds proximal detected crop plants and avoid cutting of crop plants.

8.8 Deployment: Array of Crop Rows+Multiple LIDAR sensors

In one implementation, the system 100 and/or controller 150 can execute the methods described above to (approximately) simultaneously: receive images from a suite of LIDAR sensors 140—such as arranged in parallel across the rail 120 and/or directly mounted to the chassis 110—defining a total field of view spanning an array of crop rows (e.g., four crop rows, eight crop rows, twelve crop rows, fifty crop rows); detect crop plants and/or other plant matter (e.g., weeds) at locations across the array of crop rows; and selectively trigger actuation of a set of actuator pairs 130—each actuator pair 130, in the set of actuator pairs 130, aligned to a particular crop row in the array of crop rows—according to actuator pathways defined for each actuator pair 130, in the set of actuator pairs 130, to selectively execute a target action (e.g., weeding, spraying fertilizer, spraying pesticide, thinning crops) on crop plants and/or other plant matter in each crop row in the array of crop rows.

For example, the system 100 can include: a first actuator pair 130 installed at a first position on the rail 120—aligned to a first crop row in a first set of crop rows in agricultural field; and a second actuator pair 130 installed at a second position on the rail 120—aligned to a second crop row in a second set of crop rows in agricultural field. The first actuator pair 130 can include: a first actuator 132—including a first weeding tool 134—arranged in a front position at the first position on the rail 120; and a second actuator 132—including a second weeding tool 134—arranged in a rear position at the first position on the rail 120. Furthermore, the second actuator pair 130 can include: a third actuator 132—including a third weeding tool 134—arranged in the front position at the second position on the rail 120; and a fourth actuator 132—including a fourth weeding tool 134—arranged in the rear position at the second position on the rail 120.

In this example, during operation, the controller 150 can: receive a first image—captured by a first LIDAR sensor 140 integrated into a chassis 110 of the vehicle and defining a first field of view intersecting the crop bed of the agricultural field—depicting a first region of the crop bed spanning the first set of crop rows; and, approximately concurrently, receive a second image—captured by a second LIDAR sensor 140 integrated into the chassis 110 and defining a second field of view intersecting the crop bed of the agricultural field—depicting a second region of the crop bed spanning a second set of crop rows contiguous the first set of crops rows in the agricultural field. The controller 150 can then: derive a first elevation profile for the first region of the crop bed based on features extracted from the first image; derive a second elevation profile for the second region of the crop bed based on features extracted from the second image; detect presence of a first crop plant at a first location—intersecting a first longitudinal axis extending along the first crop row and a first lateral axis perpendicular the first longitudinal axis within the first crop row—based on features extracted from the first image; and detect presence of a second crop plant at a second location—intersecting a second longitudinal axis extending along the second crop row and a second lateral axis perpendicular the second longitudinal axis within the second crop row—based on features extracted from the second image. Then, the controller 150 can: estimate a first distance from the first crop plant to the first weeding tool 134 of the first actuator pair 130; estimate a second distance from the first crop plant to the second weeding tool 134 of the first actuator pair 130; derive a first actuation pathway for the first weeding tool 134 based on the first distance and the first elevation profile; derive a second target pathway for the second weeding tool 134 based on the second distance and the first elevation profile; drive the first weeding tool 134 across a first sequence of tool locations according to the first target pathway to cut weeds behind and proximal the first crop plant and to locate the first weeding tool 134 on a first side of the first crop plant, offset the first longitudinal axis, at the first lateral axis; and drive the second weeding tool 134 across a second sequence of tool locations according to the second target pathway to cut weeds behind and proximal the first crop plant and to locate the second weeding tool 134 on a second side of the first crop plant—opposite the first side and offset the second longitudinal axis—at the second lateral axis.

Furthermore, the controller 150 can: estimate a third distance from the second crop plant to the third weeding tool 134 of the second actuator pair 130; estimate a fourth distance from the second crop plant to the fourth weeding tool 134 of the second actuator pair 130; derive a third actuation pathway for the third weeding tool 134 based on the third distance and the second elevation profile; derive a fourth target pathway for the fourth weeding tool 134 based on the fourth distance and the second elevation profile; drive the third weeding tool 134 across a third sequence of tool locations according to the third target pathway to cut weeds behind and proximal the second crop plant and to locate the third weeding tool 134 on a first side of the second crop plant, offset the second longitudinal axis, at the second lateral axis; and drive the fourth weeding tool 134 across a fourth sequence of tool locations according to the fourth target pathway to cut weeds behind and proximal the second crop plant and to locate the fourth weeding tool 134 on a second side of the second crop plant—opposite the first side and offset the second longitudinal axis—at the second lateral axis.

9. Variation: Autonomous Navigation

In one variation, in which the system 100 defines an autonomous vehicle configured to autonomously navigate the agricultural field, the controller 150 can leverage the feed of images captured by one or more LIDAR sensors 140—integrated into the vehicle—to track a location of the vehicle in the agricultural field and selectively actuate the drive unit based on the location to autonomously navigate the vehicle along crop rows within the agricultural field. In particular, in this variation, the controller 150 can: access a feed of images captured by the LIDAR sensor; localize the autonomous vehicle within the agricultural field based on features extracted from the feed of images; autonomously navigate the vehicle along the set of crop rows in the agricultural field accordingly; and, concurrently, selectively drive the set of actuator pairs 130—such as including a set of weeding tools 134—to execute the target action, such as cut weeds present in the crop bed and avoid cutting of crop plants.

In one implementation, during operation, the controller 150 can track an absolute position and orientation of the autonomous farm vehicle within a geospatial coordinate system based on data captured by the set of geospatial position and/or motion sensors. Further, the controller 150 can access: a predefined perimeter or predefined vertices of the field; a longitudinal direction and/or lateral offset of crop rows in this field; start and stop locations (e.g., within the geospatial coordinate system); a target ground speed; etc. Based on this data and the absolute position of the autonomous farm vehicle, the controller 150 can automatically navigate the autonomous farm vehicle throughout the field.

In one implementation, the controller 150 can: access a feed of optical images—such as a feed of point clouds—depicting the crop bed within a target set of crop rows and captured by a LIDAR sensor 140 of the sensor module; access geospatial and/or motion data captured by the set of geospatial and/or motion sensors; and compile these 3D-image data and geospatial data into a 3D crop map representing the crop bed throughout the field. For example, the controller 150 can implement simultaneous localization and mapping techniques to construct a 3D georeferenced map of the field.

10. Variation: Closed-Loop Controls

In one variation, the system 100 can implement closed-loop controls to monitor actuator activity and/or plant exit from below the chassis 110. In particular, in this variation, the controller 150 can leverage positional data captured by a set of encoders coupled to each actuator 132 of the actuator module—in combination with the derived 3D crop map depicting locations of target plants within the crop bed—to track movements of the set of actuators 132 and the corresponding attached tools (e.g., a weeding tool 134, a spraying tool) and therefore confirm execution of target actions by the set of actuators 132 on target plants depicted in the 3D crop map.

In particular, in this variation, the controller 150 can: leverage positional data captured by the set of encoders coupled to each actuator 132 to confirm a pathway traversed by a particular tool (e.g., weeding tool 134) attached to the actuator 132. Based on this pathway and a detected location of the target plant within the crop bed, the controller 150 can: interpret whether the tool avoided and/or contacted the target plant and therefore confirm execution of an action on the target plant; confirm an actual location and time at which the actuator 132 executed the action; confirm a position (e.g., location, orientation) of the actuator 132 and/or tool at this particular time; etc.

In one variation, the controller 150 can: access optical images of the crop bed recorded by an optical sensor—such as a LIDAR sensor 140 and/or color camera (or any other type of camera)—of the sensor module and defining a field of view facing the set of actuators 132; and confirm execution of actions on target plants by the set of actuators 132 based on features extracted from these images. In particular, in this variation, the controller 150 can: confirm execution of an action on a target plant by a particular actuator 132 in the set of actuators 132; confirm an actual time at which the actuator 132 executed the action; confirm a position of the actuator 132; etc.

In one implementation, the controller 150 can: access a first optical image—depicting a region of the crop bed extending ahead of the chassis 110 and/or set of actuators 132—captured at a first time by a rotating LIDAR sensor 140 arranged below the chassis 110 and defining a dynamic field of view; and implement methods and techniques described above to detect a target plant within the crop bed and calculate a target time for execution of an action on the target plant by a actuator 132. Then, the controller 150 can: access a feed of optical images—depicting the actuator 132 and a region of the crop bed below and/or behind the actuator 132—captured during a first time period, succeeding the first time, by the rotating LIDAR sensor; and derive a set of exit data based on features extracted from the feed of optical images. For example, the controller 150 can derive a set of exit data including: whether the actuator 132 executed the action at the target time; a first position of the actuator 132 at the target time based on the feed of optical images; and/or a second time at which the target plant (e.g., a centroid of the target plant) intersects a pathway of the actuator 132. The controller 150 can then leverage this set of exit data to further refine plant detection and/or execution of actions by the set of actuators 132 during a subsequent cycle.

Additionally or alternatively, in one implementation, the controller 150 can: access a first optical image—depicting a region of the crop bed extending ahead of the chassis 110 and/or set of actuators 132—captured at a first time by a LIDAR sensor 140 arranged above the chassis 110; implement methods and techniques described above to detect a target plant within the crop bed and calculate a target time for execution of an action on the target plant by an actuator 132; access a feed of optical images—depicting the actuator 132 and a region of the crop bed below and/or behind the actuator 132—captured by a secondary optical sensor—such as a color camera and/or LIDAR sensor 140—arranged below the chassis 110 and defining a field of view facing the actuator 132; and derive a set of exit data for the target plant based on features extracted from the feed of optical images.

The system 100s and methods described herein can be embodied and/or implemented, at least in part, as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented, at least in part, as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer-readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for weeding crops in an agricultural field comprising, at a vehicle traversing the agricultural field:
   at an initial time, receiving a first image captured by a LIDAR sensor integrated into a chassis of the vehicle, arranged proximal a front of the vehicle, and defining a field of view intersecting a crop bed of the agricultural field, the first image captured by the LIDAR sensor at approximately the initial time and depicting a first region of the crop bed spanning a first set of crop rows;
   detecting presence of a first crop plant at a first location within a first crop row, in the set of crop rows, based on features extracted from the first image, the first location intersecting a longitudinal axis extending along the first crop row and a first lateral axis perpendicular the longitudinal axis;
   deriving a first elevation profile for the first region of the crop bed based on features extracted from the first image;
   estimating a first distance from the first crop plant to a first weeding tool, in a set of weeding tools, flexibly coupled to a rail coupled to the chassis proximal a rear of the vehicle, the first weeding tool arranged at a first position on the rail aligned to the first crop row;
   deriving a first target pathway for the first weeding tool based on the first distance and the first elevation profile;
   estimating a second distance from the first crop plant to a second weeding tool, in the set of weeding tools, flexibly coupled to the rail at the first position behind the first weeding tool;
   deriving a second target pathway for the second weeding tool based on the second distance and the first elevation profile;
   driving the first weeding tool across a first sequence of tool locations according to the first target pathway to:
     cut weeds behind and proximal the first crop plant; and
     locate the first weeding tool on a first side of the first crop plant, offset the longitudinal axis, at the first lateral axis; and
   driving the second weeding tool across a second sequence of tool locations according to the second target pathway to:
     cut weeds behind and proximal the first crop plant; and
     locate the second weeding tool on a second side of the first crop plant, opposite the first side and offset the longitudinal axis, at the first lateral axis.

2. The method of claim 1:
   wherein deriving the first target pathway for the first weeding tool based on the first distance and the first elevation profile comprises:

calculating a first sequence of lateral tool positions for the first weeding tool relative the longitudinal axis based on the first distance;

accessing a target height defined for the set of weeding tools relative the crop bed;

calculating a first sequence of tool heights for the first weeding tool based on the target height and the first elevation profile, each tool height, in the first sequence of tool heights, corresponding to a lateral tool position in the first sequence of lateral tool positions; and deriving the first target pathway based on the first sequence of lateral tool positions and the first sequence of tool heights; and wherein deriving the second target pathway for the second weeding tool based on the second distance and the second elevation profile comprises:

calculating a second sequence of lateral tool positions for the second weeding tool relative the longitudinal axis based on the second distance;

calculating a second sequence of tool heights for the second weeding tool based on the target height and the first elevation profile, each tool height, in the second sequence of tool heights, corresponding to a lateral tool position in the second sequence of lateral tool positions; and deriving the second target pathway based on the second sequence of lateral tool positions and the second sequence of tool heights.

3. The method of claim 1:
further comprising:
predicting intersection of the first weeding tool and the first crop plant at a first time based on a speed of vehicle and the first distance; and
predicting intersection of the second weeding tool and the first crop plant at a second time, succeeding the first time, based on the speed of the vehicle and the second distance;
wherein driving the first weeding tool across the first sequence of tool locations according to the first target pathway to locate the first weeding tool on the first side of the first crop plant comprises driving the first weeding tool across the first sequence of tool locations according to the first target pathway to locate the first weeding tool on the first side of the first crop plant at the first time; and
wherein driving the second weeding tool across the second sequence of tool locations according to the second target pathway to locate the second weeding tool on the second side of the first crop plant comprises driving the second weeding tool across the second sequence of tool locations according to the second target pathway to locate the second weeding tool on the second side of the first crop plant at the second time.

4. The method of claim 1, wherein receiving the first image comprises receiving the first image:
captured by the LIDAR sensor defining the field of view intersecting the crop bed and excluding the rail and the set of weeding tools; and
depicting the first region of the crop bed spanning the first set of crops rows, the first region of the crop bed falling within the field of view and arranged ahead of the first weeding tool and the second weeding tool at the initial time.

5. The method of claim 1, further comprising:
detecting presence of a second crop plant at a second location within a second crop row, in the set of crop rows, based on features extracted from the first image, the second location intersecting a second longitudinal axis extending along the second crop row and a second lateral axis perpendicular the second longitudinal axis;

estimating a third distance from the second crop plant to a third weeding tool, in the set of weeding tools, transiently coupled to the rail at a second position on the rail aligned to the second crop row;

deriving a third target pathway for the third weeding tool based on the third distance and the first elevation profile;

estimating a fourth distance from the second crop plant to a fourth weeding tool, in the set of weeding tools, transiently coupled to the rail at the second position behind the third weeding tool;

deriving a fourth target pathway for the fourth weeding tool based on the fourth distance and the first elevation profile;

driving the third weeding tool across a third sequence of tool locations according to the third target pathway to:
cut weeds behind and proximal the second crop plant in the crop bed; and
locate the third weeding tool on a first side of the second crop plant, offset the second longitudinal axis, at the second lateral axis; and driving the fourth weeding tool across a fourth sequence of tool locations according to the fourth target pathway to:
cut weeds behind and proximal the second crop plant in the crop bed; and
locate the fourth weeding tool on a second side of the second crop plant, opposite the first side and offset the second longitudinal axis, at the second lateral axis.

6. The method of claim 1, further comprising:
at the initial time, receiving a second image captured by a second LIDAR sensor integrated into the chassis of the vehicle, arranged proximal the front of the vehicle laterally offset the LIDAR sensor, and defining a second field of view intersecting the crop bed of the agricultural field, the second image captured by the second LIDAR sensor at approximately the initial time and depicting a second region of the crop bed spanning a second set of crop rows contiguous the first set of crops rows in the agricultural field;

detecting presence of a second crop plant at a second location within a second crop row, in the second set of crop rows, based on features extracted from the second image, the second location intersecting a second longitudinal axis extending along the second crop row and a second lateral axis perpendicular the second longitudinal axis;

deriving a second elevation profile for the second region of the crop bed based on features extracted from the second image;

estimating a third distance from the second crop plant to a third weeding tool, in the set of weeding tools, transiently coupled to the rail at a second position aligned to the second crop row;

deriving a third target pathway for the third weeding tool based on the third distance and the second elevation profile;

estimating a fourth distance from the second crop plant to a fourth weeding tool, in the set of weeding tools, transiently coupled to the rail at the second position behind the third weeding tool;

deriving a fourth target pathway for the fourth weeding tool based on the fourth distance and the second elevation profile;
driving the third weeding tool across a third sequence of tool locations according to the third target pathway to:
cut weeds behind and proximal the second crop plant; and
locate the third weeding tool on a first side of the second crop plant, offset the second longitudinal axis, at the second lateral axis; and
driving the fourth weeding tool across a fourth sequence of tool locations according to the fourth target pathway to:
cut weeds behind and proximal the second crop plant; and
locate the fourth weeding tool on a second side of the second crop plant, opposite the first side and offset the second longitudinal axis, at the second lateral axis.

7. The method of claim 1:
wherein deriving the first target pathway for the first weeding tool and deriving the second target pathway for the second weeding tool comprises, during a first time period comprising the initial time:
accessing a first target pitch between crop plants in the agricultural field;
selecting a first tool actuation pattern, in a set of tool actuation patterns, for the set of weeding tools during the first time period based on the first target pitch;
deriving the first target pathway for the first weeding tool based on the first distance, the first elevation profile, and the first tool actuation pattern; and
deriving the second target pathway for the second weeding tool based on the second distance, the first elevation profile, and the first tool actuation pattern; and
further comprising, during a second time period, at the vehicle traversing a second agricultural field:
accessing a second target pitch between crop plants in the second agricultural field, the second target pitch exceeding the first target pitch; and
selecting a second tool actuation pattern, in the set of tool actuation patterns, for the set of weeding tools during the second time period based on the second target pitch.

8. The method of claim 7:
wherein selecting the first tool actuation pattern comprises selecting the first tool actuation pattern configured to:
locate the first weeding tool across the first sequence of tool locations on a first side of the longitudinal axis within a first subregion of the crop bed interposed between the first crop plant and a second crop plant preceding the first crop plant in the first crop row; and
locate the second weeding tool across the second sequence of tool locations on the second side of the longitudinal axis within the first subregion of the crop bed; and
wherein selecting the second tool actuation pattern comprises selecting the second tool actuation pattern configured to:
locate the first weeding tool across a third sequence of tool locations comprising:
a first subsequence of tool locations on the first side of the longitudinal axis within a second subregion of the crop bed interposed between the first crop plant and a third crop plant succeeding the first crop plant in the first crop row; and
a second subsequence of tool locations on the second side of the longitudinal axis within a third subregion of the crop bed interposed between the second subregion of the crop bed and the third crop plant; and
locate the second weeding tool across a fourth sequence of tool locations comprising:
a third subsequence of tool locations on the second side of the longitudinal axis within the second subregion of the crop bed; and
a fourth subsequence of tool locations on the first side of the longitudinal axis within the fourth subregion of the crop bed.

9. The method of claim 1, further comprising:
accessing a feed of images, comprising the first image, captured by the LIDAR sensor;
localizing the vehicle within the agricultural field based on features extracted from the feed of images; and
autonomously navigating the vehicle along the set of crop rows in the agricultural field.

10. The method of claim 9, wherein receiving the first image captured by the LIDAR sensor integrated into the chassis of the vehicle comprises receiving the first image captured by the LIDAR sensor integrated into the chassis of the vehicle comprising:
a drive unit configured to propel the vehicle forward through the agricultural field;
a set of geospatial position sensors; and
a controller configured to:
track a location of the vehicle in the agricultural field based on data captured by the set of geospatial position sensors;
selectively actuate the drive unit based on the location of the vehicle to autonomously navigate the vehicle along the set of crop rows; and
selectively drive the set of weeding tools to cut weeds present in the crop bed and avoid cutting of crop plants.

11. The method of claim 1, wherein receiving the first image captured by the LIDAR sensor integrated into the chassis of the vehicle comprises receiving the first image captured by the LIDAR sensor integrated into the chassis of the vehicle comprising a first actuator pair transiently mounted to the rail at the first position and comprising:
a first actuator mounted to a front side of the rail and comprising the first weeding tool configured to cut weeds present in topsoil within the crop bed; and
a second actuator mounted to a rear side of the rail and comprising the second weeding tool configured to cut weeds present in topsoil within the crop bed.

12. The method of claim 1, wherein receiving the first image captured by the LIDAR sensor integrated into the chassis of the vehicle comprises receiving the first image captured by the LIDAR sensor integrated into the chassis of the vehicle comprising:
a sensor module comprising a set of LIDAR sensors, comprising the LIDAR sensor, configured to capture optical images of the crop bed depicting plant matter present in the crop bed;
an actuator module including a set of actuator pairs:
configured to transiently install on the rail and selectively execute a target action on plants of a particular plant type; and comprising a first actuator pair transiently coupled to the rail at the first position at the initial time and comprising:
a first actuator mounted to a front side of the rail and comprising the first weeding tool configured to cut weeds present in topsoil within the crop bed; and
a second actuator mounted to a rear side of the rail and comprising the second weeding tool configured to cut weeds present in topsoil within the crop bed;
the chassis configured to traverse the agricultural field and support the sensor module and the actuator module; and
a controller configured to:
detect plant matter of a set of types present in the crop bed based on features extracted from images captured by the set of LIDAR sensors; and
selectively trigger the set of actuator pairs to execute the target action.

13. The method of claim 1:
further comprising:
at a first time preceding the initial time, receiving a second image captured by the LIDAR sensor at approximately the first time and depicting a second region of the crop bed spanning the first set of crop rows, the second region comprising the first crop plant and a second crop plant preceding the first crop plant in the first crop row;
detecting presence of the second crop plant at a second location within the first crop row based on features extracted from the second image;
estimating a first pitch between the first crop plant at the first location and the second crop plant at the second location; and
based on the first pitch, selecting a first tool actuation pattern, in a set of tool actuation patterns, for actuation of the first weeding tool and the second weeding tool between the second crop plant and the first crop plant;
wherein deriving the first target pathway for the first weeding tool based on the first distance and the first elevation profile comprises deriving the first target pathway for the first weeding tool based on the first distance, the first elevation profile, and the first tool actuation pattern; and
wherein deriving the second target pathway for the second weeding tool based on the second distance and the first elevation profile comprises deriving the second target pathway for the second weeding tool based on the second distance, the first elevation profile, and the first tool actuation pattern.

14. The method of claim 13, further comprising:
detecting presence of a third crop plant at a third location within the first crop row based on features extracted from the first image, the third crop plant succeeding the first crop plant within the first crop row;
estimating a second pitch between the first crop plant at the first location and the third crop plant at the third location, the fourth distance less than the third distance; and
based on the second pitch, selecting a second tool actuation pattern, in the set of tool actuation patterns, in replacement of the first tool actuation pattern, for actuation of the first weeding tool and the second weeding tool between the first crop plant and the third crop plant, the second tool actuation pattern configured to prevent cutting of the third crop plant by the first weeding tool and the second weeding tool.

15. The method of claim 1:
during a setup period preceding the initial time:
receiving confirmation of installation of a first actuator pair on the rail at the first position, the first actuator pair comprising the first weeding tool installed in a front position and the second weeding tool in a rear position on the rail;
calculating a third distance between the LIDAR sensor and the first weeding tool based on installation of the first weeding tool in the front position at the first position on the rail; and
calculating a fourth distance between the LIDAR sensor and the second weeding tool based on installation of the second weeding tool in the rear position at the first position on the rail; and
wherein estimating the first distance from the first crop plant to the first weeding tool comprises:
estimating a fifth distance between the first crop plant and the LIDAR sensor based on features extracted from the first image; and
estimating the first distance from the first crop plant to the first weeding tool based on the third distance and the fifth distance; and
wherein estimating the second distance from the first crop plant to the second weeding tool comprises estimating the second distance from the first crop plant to the second weeding tool based on the fourth distance and the fifth distance.

16. A method for weeding crops in an agricultural field comprising, at a vehicle traversing the agricultural field:
at an initial time, receiving a first image of a first region of a crop bed, spanning a set of crop rows, located within a field of view of a LIDAR sensor integrated within a chassis of the vehicle, proximal a front of the vehicle, and defining a field of view intersecting the crop bed, the first image captured by the LIDAR sensor at approximately the initial time;
detecting presence of a first crop plant at a first location within a first crop row, in the set of crop rows, based on features extracted from the first optical image;
estimating a first distance from the first crop plant to a first weeding tool, in a set of weeding tools, flexibly coupled to the chassis proximal a rear of the chassis;
predicting intersection of the first weeding tool and the first crop plant at a first time based on a speed of vehicle and the first distance;
estimating a second distance from the first crop plant to a second weeding tool, in the set of weeding tools, flexibly coupled to the chassis proximal the rear of the chassis;
predicting intersection of the second weeding tool and the first crop plant at a second time, succeeding the first time, based on the speed of the vehicle and the second distance;
triggering actuation of the first weeding tool according to a first target pathway configured to locate the first weeding tool on a first side of the first crop plant at the first time; and
triggering actuation of the second weeding tool according to a second target pathway configured to locate the second weeding tool on a second side of the first crop plant, opposite the first side, at the second time.

17. The method of claim 16, further comprising:
deriving a first elevation profile for the first region of the crop bed based on features extracted from the first image;

accessing a target height defined for the set of weeding tools relative the crop bed;
calculating a first sequence of tool heights for the first weeding tool based on the target height and the first elevation profile, the first sequence of tool heights configured to maintain the first weeding tool at the target height relative the crop bed;
calculating a second sequence of tool heights for the second weeding tool based on the target height and the first elevation profile, the second sequence of tool heights configured to maintain the second weeding tool at the target height relative the crop bed;
driving the first weeding tool across the first sequence of tool heights concurrent actuation of the first weeding tool according to the first target pathway; and
driving the second weeding tool across the second sequence of tool heights concurrent actuation of the second weeding tool according to the second target pathway.

18. The method of claim 16:
wherein estimating the first distance from the first crop plant to the first weeding tool comprises estimating the first distance from the first crop plant to the first weeding tool flexibly coupled to a rail, coupled to the chassis proximal the rear of the chassis, at a front position at a first position on the rail aligned to the first crop row;
wherein estimating the second distance from the first crop plant to the second weeding tool comprises estimating the second distance from the first crop plant to the second weeding tool flexibly coupled to the rail in a rear position at the first position on the rail; and
further comprising:
  detecting presence of a second crop plant at a second location within a second crop row, in the set of crop rows, based on features extracted from the first image;
  estimating a third distance from the second crop plant to a third weeding tool, in the set of weeding tools, flexibly coupled to the rail in the front position at a second position on the rail aligned to the second crop row;
  predicting intersection of the third weeding tool and the second crop plant at a third time based on the speed of vehicle and the third distance;
  estimating a fourth distance from the second crop plant to a fourth weeding tool, in the set of weeding tools, flexibly coupled to the rail in the rear position at the second position on the rail;
  predicting intersection of the fourth weeding tool and the second crop plant at a fourth time based on the speed of vehicle and the fourth distance;
  triggering actuation of the third weeding tool according to a third target pathway configured to locate the third weeding tool on the first side of the second crop plant at the third time; and
  triggering actuation of the fourth weeding tool according to a fourth target pathway configured to locate the fourth weeding tool on the second side of the second crop plant at the fourth time.

19. A system for autonomously weeding crops in an agricultural field comprising:
  a chassis configured to traverse the agricultural field;
  a rail coupled to the chassis proximal a rear of the chassis;
  a set of actuators transiently installed on the rail and configured to selectively execute a target action on plant matter in the crop bed;
  a first depth sensor in a set of depth sensors:
    installed within the chassis proximal a front of the chassis;
    defining a field of view excluding the rail and the set of actuators and spanning a set of crop rows within the crop bed;
    and configured to capture three-dimensional images of a crop bed of the agricultural field comprising plant matter;
  and a controller configured to:
    receive an image captured by the first depth sensor and depicting a region of the crop bed spanning the set of crop rows;
    detect plant matter of a set of types present in the set of crop rows of the crop bed based on features extracted from the image;
    derive an elevation profile representing elevations of the crop bed across the region based on features extracted from the image;
    selectively trigger the set of actuators to execute the target action based on detection of plant matter in the first set of crop rows and the elevation profile;
    selectively trigger a first actuator, in the set of actuators to drive a first weeding tool to a first side of a first crop plant, offset a longitudinal axis, at a first lateral axis; and
    selectively trigger a second actuator, in the set of actuators, to drive a second weeding tool across a second side of the first crop plant, opposite the first side and offset the longitudinal axis, at the first lateral axis.

20. The system of claim 19, wherein the set of actuators comprises:
  the first actuator:
    mounted to a front side of the rail at a first position on the rail aligned to a first crop row in the set of crop rows;
    comprising the first weeding tool configured to cut weeds present in topsoil within the crop bed; and
    configured to drive the first weeding tool along a first pathway to cut weeds within a first 180-degree semi-circular region about a crop plant present in the first crop row; and
  the second actuator:
    mounted to a rear side, opposite the front side, of the rail at the first position, the first actuator and the second actuator defining a first actuator pair;
    comprising the second weeding tool configured to cut weeds present in topsoil within the crop bed; and
    configured to drive the second weeding tool along a second pathway to cut weeds within a second 180-degree semi-circular region, opposite the first 180-degree semi-circular region, about the crop plant.

* * * * *